US010532663B2

(12) United States Patent
Ricci

(10) Patent No.: US 10,532,663 B2
(45) Date of Patent: Jan. 14, 2020

(54) ELECTRIC VEHICLE OVERHEAD CHARGING SYSTEM AND METHOD OF USE

(71) Applicant: NIO USA, Inc., San Jose, CA (US)

(72) Inventor: Christopher P. Ricci, Saratoga, CA (US)

(73) Assignee: NIO USA, Inc., San Jose, CA (US)

(*) Notice: Subject to any disclaimer, the term of this patent is extended or adjusted under 35 U.S.C. 154(b) by 280 days.

(21) Appl. No.: 15/044,940

(22) Filed: Feb. 16, 2016

(65) Prior Publication Data

US 2017/0136904 A1    May 18, 2017

Related U.S. Application Data

(60) Provisional application No. 62/255,214, filed on Nov. 13, 2015, provisional application No. 62/259,536, (Continued)

(51) Int. Cl.
B60L 5/18 (2006.01)
B60L 11/18 (2006.01)
(Continued)

(52) U.S. Cl.
CPC ............ B60L 11/1827 (2013.01); B60L 5/18 (2013.01); B60L 5/42 (2013.01); B60L 53/12 (2019.02);
(Continued)

(58) Field of Classification Search
CPC ............... B60L 11/182; B60L 11/1861; B60L 11/1838; B60L 11/1816; B60L 2230/10; B64C 39/024; B64C 2201/12
See application file for complete search history.

(56) References Cited

U.S. PATENT DOCUMENTS 3,955,657 A * 5/1976 Bossi ..................... B60L 5/42
                                                      191/2
4,331,225 A   5/1982 Bolger
(Continued)

FOREIGN PATENT DOCUMENTS

CN    102025184    4/2011
CN    203301194    11/2013
(Continued)

OTHER PUBLICATIONS

U.S. Appl. No. 14/954,436, filed Nov. 30, 2015, Ricci.
(Continued)

Primary Examiner — Drew A Dunn
Assistant Examiner — Sailesh Thapa
(74) Attorney, Agent, or Firm — Sheridan Ross P.C.

(57) ABSTRACT

Techniques for electric vehicle systems, and in particular to an electric vehicle emergency charging system and method of use. In one embodiment, a system for charging a moving electric vehicle is provided, the system comprising: an electrical storage unit disposed on the electric vehicle; a charging panel in electrical communication with the electrical storage unit; a vehicle controller that determines if the electrical storage unit requires charging and configured to determine if an overhead power source is available to charge the electrical storage unit; wherein the charging panel receives the charge from the overhead power source and charges the electrical storage unit.

17 Claims, 23 Drawing Sheets

Related U.S. Application Data filed on Nov. 24, 2015, provisional application No. 62/266,452, filed on Dec. 11, 2015.

(51) Int. Cl.

| | | |
|---|---|---|
| *B60L 5/42* | (2006.01) | |
| *B60L 53/14* | (2019.01) | |
| *B60L 53/12* | (2019.01) | |
| *B60L 53/35* | (2019.01) | |
| *B60L 53/38* | (2019.01) | |
| *B60L 53/36* | (2019.01) | |
| *B60L 53/30* | (2019.01) | |
| *B60L 53/60* | (2019.01) | |
| *B60L 53/63* | (2019.01) | |
| *B60L 53/65* | (2019.01) | |
| *B60L 53/66* | (2019.01) | |
| *B60L 53/124* | (2019.01) | |

(52) U.S. Cl.
CPC ............. *B60L 53/124* (2019.02); *B60L 53/14* (2019.02); *B60L 53/32* (2019.02); *B60L 53/35* (2019.02); *B60L 53/36* (2019.02); *B60L 53/38* (2019.02); *B60L 53/60* (2019.02); *B60L 53/63* (2019.02); *B60L 53/65* (2019.02); *B60L 53/665* (2019.02); *Y02E 60/721* (2013.01); *Y02T 10/7005* (2013.01); *Y02T 10/7072* (2013.01); *Y02T 90/121* (2013.01); *Y02T 90/122* (2013.01); *Y02T 90/125* (2013.01); *Y02T 90/128* (2013.01); *Y02T 90/14* (2013.01); *Y02T 90/16* (2013.01); *Y02T 90/163* (2013.01); *Y02T 90/169* (2013.01); *Y04S 10/126* (2013.01); *Y04S 30/14* (2013.01)

(56) References Cited

U.S. PATENT DOCUMENTS

| | | |
|---|---|---|
| 4,650,018 A | 3/1987 | Silverman, Sr. |
| 5,283,513 A | 2/1994 | Fujita et al. |
| 5,311,973 A | 5/1994 | Tseng et al. |
| 5,431,264 A | 7/1995 | Tseng et al. |
| 5,461,298 A | 10/1995 | Lara et al. |
| 5,563,491 A | 10/1996 | Tseng |
| 5,654,621 A | 8/1997 | Seelig |
| 5,696,367 A | 12/1997 | Keith |
| 5,821,728 A | 10/1998 | Schwind |
| 5,821,731 A | 10/1998 | Kuki et al. |
| 5,847,537 A | 12/1998 | Parmley, Sr. |
| 6,014,597 A | 1/2000 | Kochanneck |
| 6,291,901 B1 | 9/2001 | Cefo |
| 6,421,600 B1 | 7/2002 | Ross |
| 6,786,051 B2 | 9/2004 | Kristich et al. |
| 6,792,259 B1 | 9/2004 | Parise |
| 6,877,581 B2 | 4/2005 | Badr et al. |
| 6,879,889 B2 | 4/2005 | Ross |
| 7,602,143 B2 | 10/2009 | Capizzo |
| 7,619,319 B1 | 11/2009 | Hunter |
| 7,714,536 B1 | 5/2010 | Silberg et al. |
| 7,729,803 B2 | 6/2010 | Lim et al. |
| 7,880,337 B2 | 2/2011 | Farkas |
| 8,030,888 B2 | 10/2011 | Pandya et al. |
| 8,164,301 B2 | 4/2012 | Uchida |
| 8,169,186 B1 | 5/2012 | Haddad et al. |
| 8,324,858 B2 | 12/2012 | Hill et al. |
| 8,386,103 B2 | 2/2013 | Tran |
| 8,536,831 B2 | 9/2013 | Kanno |
| 8,544,622 B2 | 10/2013 | Vollenwyder et al. |
| 8,552,685 B2 | 10/2013 | Kanno |
| 8,575,895 B2 | 11/2013 | Garrastacho et al. |
| D706,212 S | 6/2014 | Zwierstra et al. |
| 8,760,115 B2 | 6/2014 | Kinser et al. |
| 8,768,533 B2 | 7/2014 | Ichikawa |
| 8,796,990 B2 | 8/2014 | Paparo et al. |
| 8,841,785 B2 | 9/2014 | Theuss et al. |
| 8,841,881 B2 | 9/2014 | Failing |
| 8,853,999 B2 | 10/2014 | Haddad et al. |
| 8,890,472 B2 | 11/2014 | Mashinsky |
| 8,963,481 B2 | 2/2015 | Prosser et al. |
| 8,970,060 B2 | 3/2015 | Ichikawa et al. |
| 9,007,020 B2 | 4/2015 | Prosser et al. |
| 9,018,904 B2 | 4/2015 | Seyerle et al. |
| 9,027,723 B2 | 5/2015 | Niizuma |
| 9,056,555 B1 | 6/2015 | Zhou |
| 9,067,497 B2 | 6/2015 | Ichikawa et al. |
| 9,090,315 B1 | 7/2015 | Stone et al. |
| D736,716 S | 8/2015 | Hough et al. |
| 9,114,719 B1 | 8/2015 | Failing |
| 9,120,506 B2 | 9/2015 | Isakiewitsch et al. |
| 9,123,035 B2 | 9/2015 | Penilla et al. |
| 9,124,124 B2 | 9/2015 | Van Wiemeersch et al. |
| 9,129,272 B2 | 9/2015 | Penilla et al. |
| 9,132,739 B2 | 9/2015 | Niizuma |
| 9,142,967 B2 | 9/2015 | Tomlinson |
| 9,177,305 B2 | 11/2015 | Penilla et al. |
| 9,177,306 B2 | 11/2015 | Penilla et al. |
| 9,193,277 B1 | 11/2015 | Penilla et al. |
| 9,260,029 B2 | 2/2016 | Niizuma |
| 9,272,631 B2 | 3/2016 | Bendicks |
| 9,335,179 B2 | 5/2016 | Penilla et al. |
| 9,348,381 B2 | 5/2016 | Khoo et al. |
| 9,393,878 B1 | 7/2016 | Failing |
| 9,493,085 B2 | 11/2016 | Van Wiemeersch et al. |
| 9,550,428 B1 | 1/2017 | Ertel |
| 9,552,920 B2 | 1/2017 | Bhat et al. |
| 9,592,742 B1 | 3/2017 | Sosinov et al. |
| 9,597,973 B2 | 3/2017 | Penilla et al. |
| 9,630,516 B2 | 4/2017 | Enomoto |
| 9,643,505 B2 | 5/2017 | Ichikawa et al. |
| 9,656,770 B2 | 5/2017 | Ikegami et al. |
| 9,669,719 B1 | 6/2017 | Gerber et al. |
| 9,738,168 B2 | 8/2017 | Penilla et al. |
| 9,747,792 B2 | 8/2017 | Boys |
| 9,766,671 B2 | 9/2017 | Dorn et al. |
| 9,778,653 B1 * | 10/2017 | McClintock ............. G05D 1/00 |
| 9,806,539 B2 | 10/2017 | Kubota |
| 9,809,122 B2 | 11/2017 | McGrath et al. |
| 9,837,570 B2 | 12/2017 | Retti |
| 9,854,709 B2 | 12/2017 | Niizuma |
| 9,873,347 B2 | 1/2018 | Brown |
| 9,889,756 B2 | 2/2018 | Amari |
| 9,908,426 B2 | 3/2018 | Fukushima |
| 9,925,882 B2 | 3/2018 | Penilla et al. |
| 9,925,887 B2 | 3/2018 | McGrath et al. |
| 10,011,181 B2 | 7/2018 | Dudar et al. |
| 2007/0274226 A1 | 11/2007 | Tillotson |
| 2008/0245930 A1 | 10/2008 | Nayfeh et al. |
| 2010/0039067 A1 | 2/2010 | Hill et al. |
| 2010/0156349 A1 | 6/2010 | Littrell |
| 2010/0161518 A1 | 6/2010 | Littrell |
| 2010/0230197 A1 | 9/2010 | Ortmann et al. |
| 2011/0025267 A1 | 2/2011 | Kaman et al. |
| 2011/0204845 A1 | 8/2011 | Paparo et al. |
| 2011/0291615 A1 | 12/2011 | Pandya et al. |
| 2011/0301795 A1 | 12/2011 | Failing |
| 2011/0302078 A1 | 12/2011 | Failing |
| 2012/0005031 A1 | 1/2012 | Jammer |
| 2012/0005125 A1 | 1/2012 | Jammer |
| 2012/0043931 A1 | 2/2012 | Terao et al. |
| 2012/0055751 A1 | 3/2012 | Vollenwyder et al. |
| 2012/0203410 A1 | 8/2012 | Wechlin et al. |
| 2012/0217112 A1 | 8/2012 | Zengerle |
| 2012/0233062 A1 | 9/2012 | Cornish |
| 2012/0249063 A1 | 10/2012 | Holmes et al. |
| 2012/0271758 A1 | 10/2012 | Jammer |
| 2013/0033224 A1 | 2/2013 | Raedy |
| 2013/0033228 A1 | 2/2013 | Raedy |
| 2013/0038268 A1 | 2/2013 | Markku |
| 2013/0038276 A1 | 2/2013 | Raedy |
| 2013/0076902 A1 | 3/2013 | Gao et al. |
| 2013/0105264 A1 | 5/2013 | Ruth et al. |
| 2013/0154553 A1 | 6/2013 | Steele |
| 2013/0175973 A1 | 7/2013 | Power et al. |

(56) References Cited

U.S. PATENT DOCUMENTS

| | | |
|---|---|---|
| 2013/0211988 A1 | 8/2013 | Dorn et al. |
| 2013/0248311 A1 | 9/2013 | Czainski et al. |
| 2013/0249470 A1 | 9/2013 | Martin et al. |
| 2013/0249682 A1 | 9/2013 | Van Wiemeersch et al. |
| 2013/0257144 A1 | 10/2013 | Caldeira et al. |
| 2013/0257145 A1 | 10/2013 | Caldeira et al. |
| 2013/0328387 A1 | 12/2013 | Venkateswaran et al. |
| 2014/0012448 A1 | 1/2014 | Tripathi et al. |
| 2014/0042752 A1 | 2/2014 | McDermott |
| 2014/0062392 A1 | 3/2014 | Lofy et al. |
| 2014/0067660 A1 | 3/2014 | Cornish |
| 2014/0070767 A1 | 3/2014 | Morris et al. |
| 2014/0088804 A1 | 3/2014 | Hyde et al. |
| 2014/0089064 A1 | 3/2014 | Hyde et al. |
| 2014/0217975 A1 | 8/2014 | Hayashi |
| 2014/0232331 A1 | 8/2014 | Stamenic et al. |
| 2014/0239891 A1 | 8/2014 | Martin et al. |
| 2014/0278104 A1 | 9/2014 | Proietty et al. |
| 2014/0333256 A1 | 11/2014 | Widmer et al. |
| 2015/0002094 A1 | 1/2015 | Haddad et al. |
| 2015/0028807 A1 | 1/2015 | Mashinsky |
| 2015/0035484 A1 | 2/2015 | Mashinsky |
| 2015/0041598 A1 | 2/2015 | Nugent et al. |
| 2015/0042211 A1 | 2/2015 | Pan |
| 2015/0088352 A1 | 3/2015 | Gunter |
| 2015/0094887 A1* | 4/2015 | Kawashima .......... B60L 11/182 701/22 |
| 2015/0097530 A1 | 4/2015 | Scarlatti et al. |
| 2015/0137801 A1 | 5/2015 | Raedy et al. |
| 2015/0233962 A1 | 8/2015 | Tchoryk et al. |
| 2015/0314695 A1* | 11/2015 | McGrath ................ B60L 5/36 320/109 |
| 2015/0321570 A1* | 11/2015 | Cun .................. B60L 11/1803 705/34 |
| 2015/0333540 A1 | 11/2015 | Niizuma |
| 2015/0336677 A1 | 11/2015 | Smaoui et al. |
| 2016/0009255 A1 | 1/2016 | Droste |
| 2016/0025960 A1 | 1/2016 | Theberge et al. |
| 2016/0049831 A1 | 2/2016 | Nakano et al. |
| 2016/0129793 A1 | 5/2016 | Cronie |
| 2016/0144735 A1 | 5/2016 | Haddad et al. |
| 2016/0272074 A1* | 9/2016 | McGrath ................ B60M 7/003 |
| 2016/0290832 A1 | 10/2016 | Raedy et al. |
| 2016/0303980 A1 | 10/2016 | Cyr et al. |
| 2017/0026122 A1 | 1/2017 | Everett et al. |
| 2017/0028854 A1 | 2/2017 | Lee et al. |
| 2017/0072808 A1 | 3/2017 | Caldeira |
| 2017/0141368 A1 | 5/2017 | Ricci |
| 2017/0142872 A1 | 5/2017 | Ricci |
| 2017/0183095 A1 | 6/2017 | Liu et al. |
| 2018/0037136 A1 | 2/2018 | Nelson et al. |
| 2018/0201152 A1 | 7/2018 | Newman et al. |

FOREIGN PATENT DOCUMENTS

| | | |
|---|---|---|
| EP | 2711876 | 3/2014 |
| JP | 2010-166675 | 7/2010 |
| KR | 2017-0045908 | 4/2017 |
| WO | WO 2010/000495 | 1/2010 |
| WO | WO 2011/045883 | 4/2011 |
| WO | WO 2011/106506 | 9/2011 |

OTHER PUBLICATIONS

U.S. Appl. No. 14/954,484, filed Nov. 30, 2015, Ricci.
U.S. Appl. No. 14/979,158, filed Dec. 22, 2015, Ricci.
U.S. Appl. No. 14/981,368, filed Dec. 28, 2015, Ricci.
U.S. Appl. No. 15/010,701, filed Jan. 29, 2016, Ricci.
U.S. Appl. No. 15/010,921, filed Jan. 29, 2016, Ricci.
U.S. Appl. No. 15/048,307, filed Feb. 19, 2016, Ricci.
U.S. Appl. No. 15/143,083, filed Apr. 29, 2016, Ricci.
U.S. Appl. No. 15/145,416, filed May 3, 2016, Ricci.

"Inductive charging," Wikipedia, 2015, retrieved from https://en.wikipedia.org/wiki/Inductive_charging, 6 pages.
"Meet the Plugless L2," Pluglesspower.com, 2014, retrieved from https://web.archive.org/web/20150920163501/https://www.pluglesspower.com/, 5 pages.
"Someday Your EV Charger May Be the Roadway Itself," MIT Technology Review, 2013, retrieved from http://www.technologyreview.com/news/521761/someday-your-ev-charger-may-be-the-roadway-itself/, 2 pages.
"Wireless Charging for Electric Vehicles," brochure, QUALCOMM HALO, 2011, 6 pages.
"Wireless Charging," PowerbyProxi, 2015, retrieved from https://powerbyproxi.com/wireless-charging/, 5 pages.
Brachmann, Wireless induction charging is coming to electric vehicles IPWatchdog, 2015, retrieved from http://www.ipwatchdog.com/2015/06/18/wireless-induction-charging-is-coming-to-electric-vehicles/id=58756/, 6 pages.
Crawford, "UK motorway to charge electric cars on the move," E&T, 2014, retrieved from http://eandt.theiet.org/news/2014/apr/onroad-charging.cfm, 4 pages.
Gitlin, "Cutting the cord: Ars goes hands-on with Qualcomm Halo wireless car charging," Ars Technica, 2015, retrieved from http://arstechnica.com/cars/2015/04/cutting-the-cord-ars-goes-hands-on-with-qualcomm-halo-wireless-car-charging/, 5 pages.
Gordon-Bloomfield, "Infiniti Delays LE Electric Sedan Production Plans," PluginCars.com, 2013, retrieved from http://www.plugincars.com/print/127405, 2 pages.
Greimel, "Nissan's next Evs: More mainstream, better battery," Automotive News, 2014, retrieved from http://www.autonews.com/article/20140507/OEM05/140909845?template=printart, 2 pages.
Harris, "Your questions answered: inductive charging for road vehicles," the Engineer, 2013, retrieved from http://www.theengineer.co.uk/automotive/in-depth/your-questions-answered-inductive-charging-for-road-vehicles, 8 pages.
Ivanco et al., "Wireless Charging Panel," EV Roadmap 7, 2014, 15 pages.
Li et al., "Energy Management and Control of Electric Vehicle Charging Stations," Electric Power Components and Systems, 2014, vol. 42(3-4), pp. 339-347.
Marks, "Wireless Charging for Electric vehicles hits the road," New Scientist, 2014, Issue 2593, retrieved from https://www.newscientist.com/article/mg22129534-900-wireless-charging-for-electric-vehicles-hits-the-road/, 2 pages.
Morris, "What's up with wireless EV charging," Charged Evs, 2013, retrieved from https://chargedevs.com/features/whats-wireless-ev-charging/, 9 pages.
Rim, "Wireless Power Transfer Systems for Roadway-powered Electric Vehicles," IEEE, 2014, retrieved from http//tec.ieee.org/2014/09/02/wireless-power-transfer-systems-roadway-powered-electric-vehicles/, 6 pages.
Stewart, "2014 Infiniti EV to Debut Wireless Inductive Charging System," Popular Mechanics, 2011, retrieved from http://www.popularmechanics.com/cars/hybrid-electrica/a/7331/2014-infiniti-ev-to-debut-wireless-inductive-charging-system/, 4 pages.
Szondy, "BMW developing wireless inductive charging system for electric vehicles," gizmag.com, 2014, retrieved from http://newatlas.com/bmw-induction-charging/32863/, 4 pages.
Taylor, "Unplugged: Audi Readying Wireless Induction Charging for Q7 e-tron," Car and Driver, 2015, retrieved from http://blog.caranddriver.com/unplugged-audi-readying-wireless-induction-charging-for-q7-e-tron/2 pages.
Official Action for U.S. Appl. No. 15/010,921, dated Jan. 12, 2018 32 pages.
Official Action for U.S. Appl. No. 15/145,416, dated Oct. 19, 2017 12 pages.
Official Action for U.S. Appl. No. 15/143,0836, dated Oct. 23, 2017 16 pages.
Official Action for U.S. Appl. No. 15/010,701, dated Apr. 9, 2018, 17 pages.
Final Action for U.S. Appl. No. 15/010,921, dated Jun. 1, 2018, 17 pages.
Final Action for U.S. Appl. No. 15/145,416, dated Mar. 19, 2018 14 pages.

(56) References Cited

OTHER PUBLICATIONS

Final Action for U.S. Appl. No. 15/143,0836, dated May 10, 2018 18 pages.
Notice of Allowance for U.S. Appl. No. 15/010,701, dated Sep. 18, 2018, 14 pages.
Notice of Allowance for U.S. Appl. No. 15/010,701, dated Oct. 3, 2018, 4 pages.
Official Action for U.S, Appl. No. 15/010,921, dated Sep, 21, 2018, 18 pages.
Final Action for U.S. Appl. No. 15/010,921, dated Jan. 25, 2019, 21 pages.
Official Action for U.S. Appl. No. 15/145,416, dated Jan. 11, 2019 16 pages.
Official Action for U.S. Appl. No. 15/143,083, dated Jan. 14, 2019 19 pages.
Official Action for U.S. Appl. No. 15/145,416, dated Aug. 8, 2019 9 pages.
Official Action for U.S. Appl. No. 15/143,083, dated Aug. 7, 2019 22 pages.

* cited by examiner

| Panel Type | Roadway | Separ-ation | Pitch | Flap Setting | Vertical Max Load | Obstacle Risk | Roadway Type | Other |
|---|---|---|---|---|---|---|---|---|
| Flat F3 | CO I-25 | 8 inch | 0 deg | n/a | 300 lb | Moderate | X | A, B, C |
| | CO I-70 | 6 | 0 | n/a | 300 lb | Low | X, Z | A, B, D |
| | CO-H36 | 5 | 0 | n/a | 300 lb | Very Low | X, Y, Z | A, C, E |
| Airfoil A4 | CO I-25 | 8 | 0 deg | 0 deg | 450 lb | Moderate | X | A, B |
| | CO I-70 | 6 | 3 | 5 | 700 lb | Low | X, Z | A, B, C |
| | CO-H36 | 5 | 2 | 2 | 600 lb | Very Low | X, Y, Z | A, B, D |

Fig. 3

| Emergency Charging Type | Separation | Charge Rate | Location | Stationary | Wx: Visibility$_{MIN}$ | Wx: Winds$_{MAX}$ | Other |
|---|---|---|---|---|---|---|---|
| Contact | 0 inch | Low | I-25 Hwy | No | 10 miles | 10 Kts | A, B, C |
|  | 0 | Medium | Spot A | Yes | 5 | 15 | A, B, D |
|  | 0 | High | Spot B | Yes | 5 | 15 | A, C, E |
| Flyer | 8 | Low | I-25 Hwy | No | 10 | 10 | A, B |
|  | 6 | Medium | Spot A | Yes | 5 | 15 | A, B, C |
|  | 5 | High | Spot B | Yes | 5 | 15 | A, B, D |

Fig. 16

ELECTRIC VEHICLE OVERHEAD CHARGING SYSTEM AND METHOD OF USE

CROSS REFERENCE TO RELATED APPLICATIONS

The present application claims the benefits of and priority, under 35 U.S.C. § 119(e), to U.S. Provisional Patent Application Ser. Nos. 62/255,214, filed on Nov. 13, 2015, entitled "Electric Vehicle Systems and Operation;" 62/259,536, filed Nov. 24, 2015, entitled "Charging Transmission Line Under Roadway for Moving Electric Vehicle;" and 62/266,452, filed Dec. 11, 2015, entitled "Charging Transmission Line Under Roadway for Moving Electric Vehicle."

This application is also related to U.S. patent application Ser. No. 14/954,436, filed on Nov. 30, 2015, entitled "Electric Vehicle Roadway Charging System and Method of Use;" Ser. No. 14/954,484, filed on Nov. 30, 2015, entitled "Electric Vehicle Charging Device Positioning and Method of Use;" Ser. No. 14/979,158, filed on Dec. 22, 2015, entitled "Electric Vehicle Charging Device Alignment and Method of Use;" Ser. No. 14/979,158, filed on Dec. 22, 2015, entitled "Electric Vehicle Charging Device Alignment and Method of Use;" Ser. No. 14/981,368, filed on Dec. 28, 2015, entitled "Electric Vehicle Charging Device Obstacle Avoidance and Warning System and Method of Use;" Ser. No. 15/010,701, filed on Jan. 29, 2016, entitled "Electric Vehicle Emergency Charging System and Method of Use;" and Ser. No. 15/010,921, filed on Jan. 29, 2016, entitled "Electric VehicleAerial Vehicle Charging System and Method of Use;" the entire disclosures of which are hereby incorporated herein by reference, in its entirety, for all that it teaches and for all purposes.

FIELD OF THE INVENTION

The disclosure relates generally to electric vehicle systems, and in particular to electric vehicle charging systems and associated methods of use.

BACKGROUND OF THE INVENTION

In recent years, transportation methods have changed substantially. This change is due in part to a concern over the limited availability of natural resources, a proliferation in personal technology, and a societal shift to adopt more environmentally friendly transportation solutions. These considerations have encouraged the development of a number of new flexible-fuel vehicles, hybrid-electric vehicles, and electric vehicles.

While these vehicles appear to be new they are generally implemented as a number of traditional subsystems that are merely tied to an alternative power source. In fact, the design and construction of the vehicles is limited to standard frame sizes, shapes, materials, and transportation concepts. Among other things, these limitations fail to take advantage of the benefits of new technology, power sources, and support infrastructure.

Existing devices and methods to charge electric vehicles are typically limited to fixed locations and of are of limited utility. Therefore, there is a need for an adaptable charging system that may operate remotely or while the charging vehicle is moving. This disclosure solves those needs.

By way of providing additional background, context, and to further satisfy the written description requirements of 35 U.S.C. § 112, the following references are hereby incorporated by reference in their entireties for all purposes and all that is disclosed: U.S. Pat. No. 5,311,973, issued May 17, 1994; U.S. Pat. No. 5,821,728 issued Oct. 13, 1998; U.S. Pat. No. 6,421,600, issued Jul. 16, 2002; 6,879,889 issued Apr. 12, 2005; and U.S. Pat. No. 8,544,622 issued Oct. 1, 2013; and U.S. Pat. Publ. Nos. 2012/0055751 published Mar. 8, 2012; 2012/0203410 published Aug. 9, 2012; 2012/0217112, published Aug. 30, 2012; 2013/0248311; and 2015/0137801 published May 21, 2015; and PCT Application No. WO2010/000495 published Jan. 7, 2010.

SUMMARY OF THE INVENTION

The disclosure provides a system and method of use to provide electric vehicle charging. Specifically, systems and methods to provide charging through induction are presented.

In one embodiment, a system for charging a moving electric vehicle is disclosed, the system comprising: an electrical storage unit disposed on the electric vehicle; a charging panel in electrical communication with the electrical storage unit; a vehicle controller that determines if the electrical storage unit requires charging and configured to determine if an overhead power source is available to charge the electrical storage unit; wherein the charging panel receives the charge from the overhead power source and charges the electrical storage unit.

In another embodiment, a method for charging a moving electric vehicle is disclosed, the method comprising: determining, by a microprocessor, a charge value of an electrical storage unit disposed on the electric vehicle; determining, by the microprocessor, if the charge value is below a selectable threshold value wherein charging of the electrical storage unit is required; identifying, by the microprocessor, if an overhead power source is available for charging of the electrical storage unit; and positioning, by the microprocessor, a charging panel of the electric vehicle, the charging panel positioned to receive charging from a charging line of the overhead power source; wherein the charging panel receives charging from the charging line and charges the electrical storage unit.

In other embodiments, the method, system and/or device may comprise: wherein the charging panel is configured to operate in a plurality of states comprising a retracted state and a deployed state; an actuator interconnected to the charging panel and to the electric vehicle, wherein the actuator is configured to move the charging panel to receive the charge from the overhead power source; at least one range sensor configured to measure a first measured distance between a first point on the charging panel and a second point on a first wire of the overhead power source; wherein a selectable nominal deployment distance is selected from a vehicle database; wherein the positioning of the first point of the charging panel to the selectable nominal deployment distance is performed automatically by actuation of the actuator; wherein the vehicle controller receives the first measured distance and automatically actuates the actuator to adjust the position of the charging panel to the desired nominal deployment distance; wherein the overhead power source comprises a first wire attached to a plurality of towers disposed on or adjacent a roadway; wherein the charging panel is interconnected with a pantograph, the pantograph enabling the charging panel to operate in a retracted state and a deployed state; wherein a charging level of the charging is selectable from a vehicle database; wherein the charging panel is in physical contact with a first wire of the overhead power source; and wherein the vehicle controller queries a vehicle database to determine if the moving electric vehicle is compatible with the overhead power source to enable charging.

BRIEF DESCRIPTION OF THE DRAWINGS

For a more complete understanding of the present disclosure and its advantages, reference is now made to the following description taken in conjunction with the accompanying drawings, in which like reference numerals represent like parts:

FIG. 3 is a diagram of an embodiment of a data structure for storing information about a charging panel configuration for given roadway types;

FIG. 16 is a diagram of an embodiment of a data structure for storing information about a charging panel configuration for a given aerial vehicle charging environment;

Figure 1A:
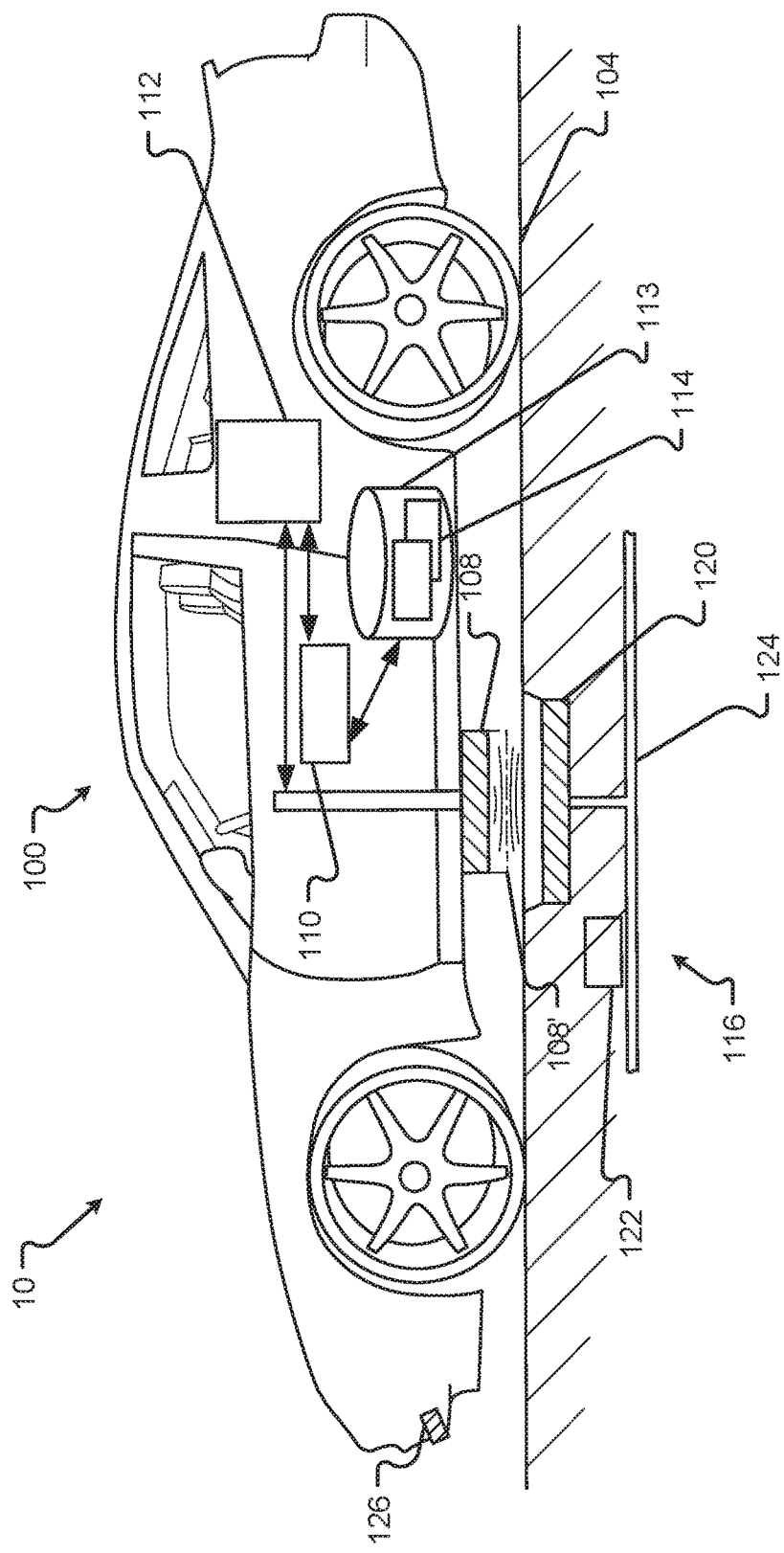
FIG. 1A shows a vehicle in a charging environment in accordance with embodiments of the present disclosure.

It should be understood that the drawings are not necessarily to scale. In certain instances, details that are not necessary for an understanding of the invention or that render other details difficult to perceive may have been omitted. It should be understood, of course, that the invention is not necessarily limited to the particular embodiments illustrated herein.

To assist in the understanding of the present invention the following list of components and associated numbering found in the drawings is provided herein:

| # | Component |
|---|---|
| 10 | System |
| 100 | Vehicle |
| 102 | Travel Environment |
| 104 | Roadway (Street or Other Travel Path) |
| 108 | Charging Panel (retracted) |
| 108' | Charging Panel (deployed) |
| 108A | Charging Panel Airfoil Flap (extended) |
| 110 | Charging Panel Controller |
| 112 | Energy Storage Unit |
| 113 | Vehicle Database |
| 114 | Data Structures |
| 115A-N | Data Structure Fields |
| 116 | (Charging) Power Source |
| 120 | Charging Area/Plate |
| 120A-C | Various Charging Areas within Travel Environment |
| 122 | Charge Provider Controller |
| 124 | Transmission Line |
| 126 | Vehicle Sensors |
| 127 | Separation Distance Sensor |
| 132 | Direction or Path |
| 140A | Parking Space |
| 140B | Traffic Controlled Space |
| 204 | Armature |
| 208 | Separation Distance |
| 212 | Position for Receiving a Charge |
| 214 | Direction |
| 214A | First Direction (axis) |
| 214B | Second Direction (axis) |
| 214C | Third Direction (axis) |
| 215A-C | Roll, Pitch, Yaw Direction (axis) |
| 220 | Shield position one |
| 220' | Shield position two |
| 226 | Protective device |
| 700 | Graphical user interface |
| 704 | Display device |
| 708 | Feedback adjustment image one |
| 708' | Feedback adjustment image two |
| 712 | (Charging) Power Source centerline icon |
| 716 | (Charging) Power Source icon |
| 720 | Charging Panel centerline icon |
| 724 | Alignment instruction |
| 914 | Sensor Data Structure |
| 915A-N | Sensor Data Structure Fields |
| 928 | Obstacle |
| 1200 | Emergency Charging Vehicle |
| 1240 | Charging Cable |
| 1250 | Connector |
| 1314 | Emergency Charging Data Structure |
| 1315A-M | Emergency Charging Data Structure Fields |
| 1500 | Aerial Vehicle |
| 1510 | Tether |
| 1514 | Aerial Vehicle Charging Data Structure |
| 1515A-M | Aerial Vehicle Charging Data Structure Fields |
| 1800 | Overhead Charging System |
| 1810 | Tower |

-continued

| # | Component |
|---|---|
| 1814 | First Wire |
| 1818 | Second Wire |
| 1820 | Pantograph |
| 1824 | Overhead Contact |
| 1834 | Overhead Charging Data Structure |
| 1835A-L | Overhead Charging Data Structure Fields |

DETAILED DESCRIPTION OF THE INVENTION

In the following detailed description, numerous specific details are set forth in order to provide a thorough understanding of the disclosed techniques. However, it will be understood by those skilled in the art that the present embodiments may be practiced without these specific details. In other instances, well-known methods, procedures, components and circuits have not been described in detail so as not to obscure the present disclosure.

Although embodiments are not limited in this regard, discussions utilizing terms such as, for example, "processing," "computing," "calculating," "determining," "establishing", "analyzing", "checking", or the like, may refer to operation(s) and/or process(es) of a computer, a computing platform, a computing system, a communication system or subsystem, or other electronic computing device, that manipulate and/or transform data represented as physical (e.g., electronic) quantities within the computer's registers and/or memories into other data similarly represented as physical quantities within the computer's registers and/or memories or other information storage medium that may store instructions to perform operations and/or processes.

Although embodiments are not limited in this regard, the terms "plurality" and "a plurality" as used herein may include, for example, "multiple" or "two or more". The terms "plurality" or "a plurality" may be used throughout the specification to describe two or more components, devices, elements, units, parameters, circuits, or the like.

The term "armature" means a moveable portion of an electromagnetic system or device.

The term "inductive charging" means the use of an EM field to transfer energy between two objects.

The term "display" refers to a portion of a screen used to display the output of a computer to a user.

The term "displayed image" or "displayed object" refers to an image produced on the display. A typical displayed image is a window or desktop or portion thereof, such as an icon. The displayed image may occupy all or a portion of the display.

The terms "communication device," "smartphone," and "mobile device," and variations thereof, as used herein, are used interchangeably and include any type of device capable of communicating with one or more of another device and/or across a communications network, via a communications protocol, and the like. Exemplary communication devices may include but are not limited to smartphones, handheld computers, laptops, netbooks, notebook computers, subnotebooks, tablet computers, scanners, portable gaming devices, phones, pagers, GPS modules, portable music players, and other Internet-enabled and/or network-connected devices.

The term "automatic" and variations thereof, as used herein, refers to any process or operation done without material human input when the process or operation is performed. However, a process or operation can be automatic, even though performance of the process or operation uses material or immaterial human input, if the input is received before performance of the process or operation. Human input is deemed to be material if such input influences how the process or operation will be performed. Human input that consents to the performance of the process or operation is not deemed to be "material".

The term "screen," "touch screen," or "touchscreen" refers to a physical structure that enables the user to interact with the computer by touching areas on the screen and provides information to a user through a display. The touch screen may sense user contact in a number of different ways, such as by a change in an electrical parameter (e.g., resistance or capacitance), acoustic wave variations, infrared radiation proximity detection, light variation detection, and the like. In a resistive touch screen, for example, normally separated conductive and resistive metallic layers in the screen pass an electrical current. When a user touches the screen, the two layers make contact in the contacted location, whereby a change in electrical field is noted and the coordinates of the contacted location calculated. In a capacitive touch screen, a capacitive layer stores electrical charge, which is discharged to the user upon contact with the touch screen, causing a decrease in the charge of the capacitive layer. The decrease is measured, and the contacted location coordinates determined. In a surface acoustic wave touch screen, an acoustic wave is transmitted through the screen, and the acoustic wave is disturbed by user contact. A receiving transducer detects the user contact instance and determines the contacted location coordinates. The touch screen may or may not include a proximity sensor to sense a nearness of object, such as a user digit, to the screen.

Before undertaking the description of embodiments below, it may be advantageous to set forth definitions of certain words and phrases used throughout this document: the terms "include" and "comprise," as well as derivatives thereof, mean inclusion without limitation; the term "or," is inclusive, meaning and/or; the phrases "associated with" and "associated therewith," as well as derivatives thereof, may mean to include, be included within, interconnect with, interconnected with, contain, be contained within, connect to or with, couple to or with, be communicable with, cooperate with, interleave, juxtapose, be proximate to, be bound to or with, have, or the like; and the term "controller" means any device, system or part thereof that controls at least one operation, such a device may be implemented in hardware, circuitry, firmware or software, or combination of at least two of the same. It should be noted that the functionality associated with any particular controller may be centralized or distributed, whether locally or remotely. Definitions for certain words and phrases are provided throughout this document and those of ordinary skill in the art should understand that in many, if not most instances, such definitions apply to prior, as well as future uses of such defined words and phrases.

For purposes of explanation, numerous details are set forth in order to provide a thorough understanding of the present techniques. It should be appreciated however that the present disclosure may be practiced in a variety of ways beyond the specific details set forth herein. Furthermore, while the exemplary embodiments illustrated herein show various components of the system collocated, it is to be appreciated that the various components of the system can be located at distant portions of a distributed network, such as a communications network, node, and/or the Internet, or within a dedicated secured, unsecured, and/or encrypted system and/or within a network operation or management device that is located inside or outside the network. As an example, a wireless device can also be used to refer to any device, system or module that manages and/or configures or communicates with any one or more aspects of the network or communications environment and/or transceiver(s) and/or stations and/or access point(s) described herein.

Thus, it should be appreciated that the components of the system can be combined into one or more devices, or split between devices.

Furthermore, it should be appreciated that the various links, including the communications channel(s) connecting the elements can be wired or wireless links or any combination thereof, or any other known or later developed element(s) capable of supplying and/or communicating data to and from the connected elements. The term module as used herein can refer to any known or later developed hardware, circuit, circuitry, software, firmware, or combination thereof, that is capable of performing the functionality associated with that element. The terms determine, calculate, and compute and variations thereof, as used herein are used interchangeable and include any type of methodology, process, technique, mathematical operational or protocol.

With attention to FIGS. 1-20, embodiments of the electric vehicle charging system 100 and method of use are depicted.

In one embodiment, methods and systems are described that determine whether a charging panel associated with an electric vehicle should be deployed to charge an energy storage unit of the vehicle. In some embodiments, an in-roadway (such as a parking space) charging area is employed. The automobile may require, e.g., a charge, in a proper location for charging, sufficient time to receive a charge, etc. Conditions are analyzed by the vehicle and/or the charging system, wherein a charge may be authorized. In some embodiments, a charging panel or circuit may be distally disposed on an armature that may hover over a charging circuit in a roadway. The armature may move in three dimensions and/or in three axes to maintain an optimal distance from the charging circuit but still keep the panel from impacting the roadway or other road hazards. A suite of sensors may monitor the roadway ahead to allow the armature to adjust to sensed hazards.

Referring to FIG. 1A, a vehicle 100 is shown in a charging environment in accordance with embodiments of the present disclosure. The system 10 comprises a vehicle 100, an electrical storage unit 112, an external power source 116 able to provide a charge to the vehicle 100, a charging panel 108 mounted on the vehicle 100 and in electrical communication with the electrical storage unit 112, and a vehicle charging panel controller 112. The charging panel controller 112 may determine if the electrical storage unit requires charging and if conditions allow for deployment of a charging panel. The vehicle charging panel 108 may operate in at least a retracted state and a deployed state (108 and 108' as shown is FIG. 1A), and is movable by way of an armature 204.

The charging panel controller 112 may receive signals from vehicle sensors 126 to determine, for example, if a hazard is present in the path of the vehicle 100 such that deployment of the vehicle charging panel 108 is inadvisable. The charging panel controller 112 may also query a vehicle database 113 comprising data structures 114 to establish other required conditions for deployment. For example, the database may provide that a particular roadway does not provide a charging service or the charging service is inactive, wherein the charging panel 108 would not be deployed.

The power source 116 may include at least one electrical transmission line 124 and at least one power transmitter or charging area 120. During a charge, the charging panel 108 may serve to transfer energy from the power source 116 to at least one energy storage unit 112 (e.g., battery, capacitor, power cell, etc.) of the electric vehicle 100.

Figure 1B:
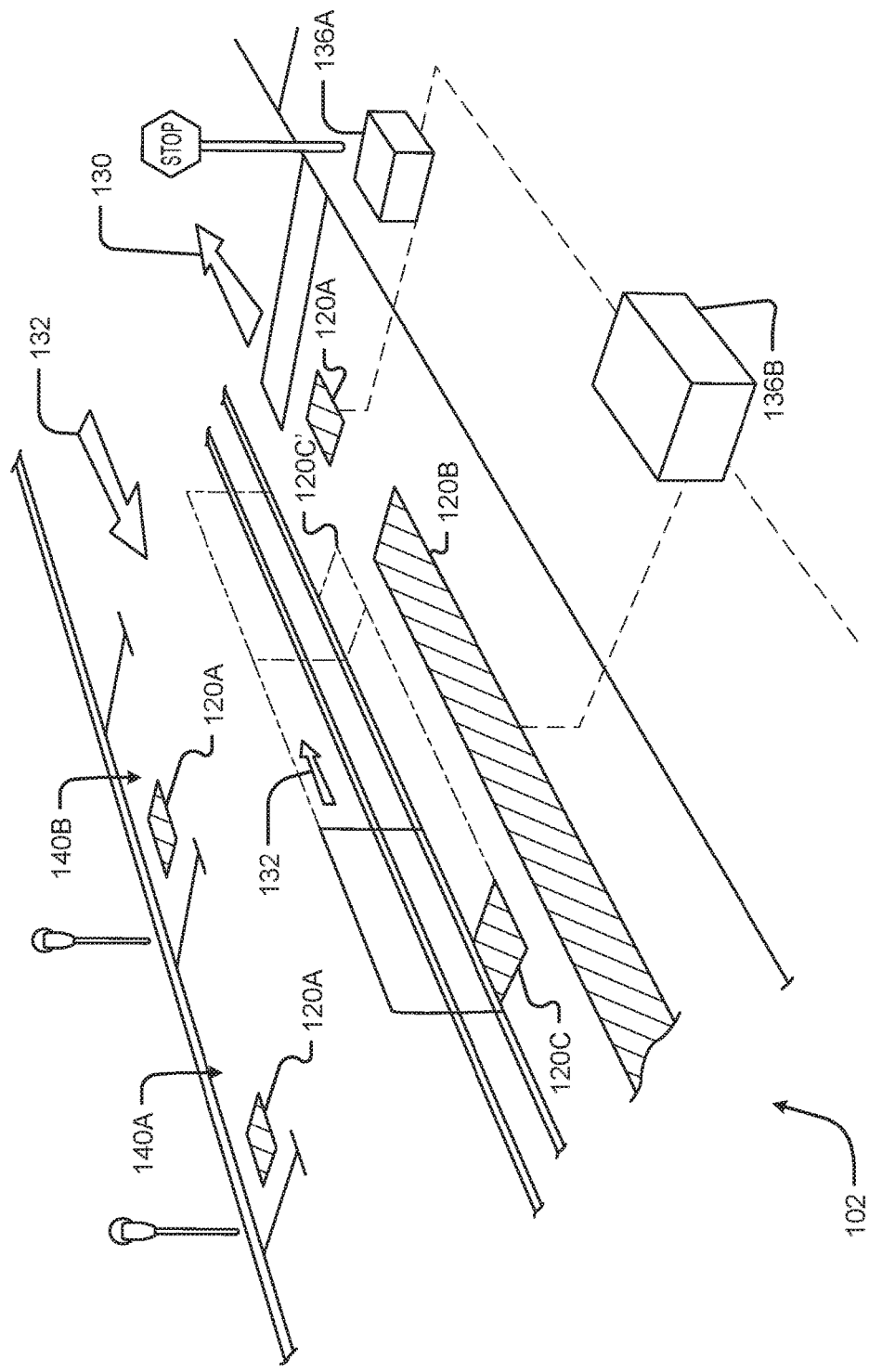
FIG. 1B shows charging areas associated with an environment in accordance with embodiments of the present disclosure.

In some embodiments, the power source 116 may be associated with a particular charging area of a travel environment 102. Referring to FIG. 1B, various charging areas 120A-C are shown in a vehicle travel environment 102 in accordance with embodiments of the present disclosure. The charging areas 120A, 120B may be positioned a static area such as a designated spot, pad, parking space 140A, 140B, traffic controlled space (e.g., an area adjacent to a stop sign, traffic light, gate, etc.), portion of a building, portion of a structure, etc., and/or combinations thereof. Some static charging areas may require that the electric vehicle 100 is stationary before a charge, or electrical energy transfer, is initiated. In some cases, the charging panel 108 may make a physical connection with the power source 116. As can be appreciated, the charging panel 108 may include a plug or other protruding feature and the power source 116 may include a receptacle or other receiving feature, and/or vice versa.

Another example of a static charging area may include a portion of a roadway 104, street, or other travel path that is configured to provide electrical charging energy to a charging panel 108 of a vehicle 100. The charging area may be in the roadway 104, on the roadway 104, or otherwise adjacent to the roadway 104, and/or combinations thereof. This static charging area 120B may allow a charge to be transferred even while the electrical vehicle 100 is moving. For example, the static charging area 120B may include a charging transmitter (e.g., conductor, etc.) that provides a transfer of energy when in a suitable range of a receiving unit (e.g., an inductor pick up, etc.). In this example, the receiving unit may be a part of the charging panel 108 associated with the electrical vehicle 100.

The charging area may be a moving charging area 120C. Moving charging areas 120C may include charging areas associated with one or more portions of a vehicle, a robotic charging device, a tracked charging device, a rail charging device, etc., and/or combinations thereof. In a moving charging area 120C, the electrical vehicle 100 may be configured to receive a charge, via the charging panel 108, while the vehicle 100 is moving and/or while the vehicle 100 is stationary. In some embodiments, the electrical vehicle 100 may synchronize to move at the same speed, acceleration, and/or path as the moving charging area 120C. In one embodiment, the moving charging area 120C may synchronize to move at the same speed, acceleration, and/or path as the electrical vehicle 100. In any event, the synchronization may be based on an exchange of information communicated across a communications channel between the electric vehicle 100 and the charging area 120C. Additionally or alternatively, the synchronization may be based on information associated with a movement of the electric vehicle 100 and/or the moving charging area 120C. In some embodiments, the moving charging area 120C may be configured to move along a direction or path 132 from an origin position to a destination position 120C'.

In some embodiments, a transformer 136A, 136B may be included to convert a power setting associated with a main power supply to a power supply used by the charging areas 120A-C. For example, the transformer 136A, 136B may increase or decrease a voltage associated with power supplied via one or more power transmission lines.

As can be appreciated, when the electrical vehicle 100 determines that a charge is required, a deployment or charging panel controller 110 controller (e.g., a hardware device comprising a processor configured to control an actuation of the charging panel 108, etc.) may determine whether to deploy the charging panel 108 of the electric vehicle 100. Factors, or conditions, contributing to this determination may include, but is in no way limited to, charge level of the vehicle 100, location of the vehicle 100, location of a charging area 120, a capability of the charging area 120 (e.g., energy transfer rating, compatibility with the charging panel 108 and/or vehicle 100, static charging capability, moving charging capability, etc.), obstacles between the charging panel 108 and the charging area 120, anticipated travel path of the vehicle 100, time required to charge, travel time, stopping time, etc., and/or combinations thereof. Among other things, these factors may be analyzed to determine whether the electric vehicle 100 is capable of receiving a charge (e.g., enough time to receive a charge, etc.). Once these conditions are analyzed by at least one of the deployment controller, another controller of the vehicle, the charging system and/or combinations thereof, a charge may be authorized. The authorization of a charge may include receiving a charge initiation key (e.g., from an authentication server, one or more components associated with the charging area, etc.). In any event, the authorization of the charge causes the charging panel 108 of the vehicle 100 to deploy.

Figure 2A:
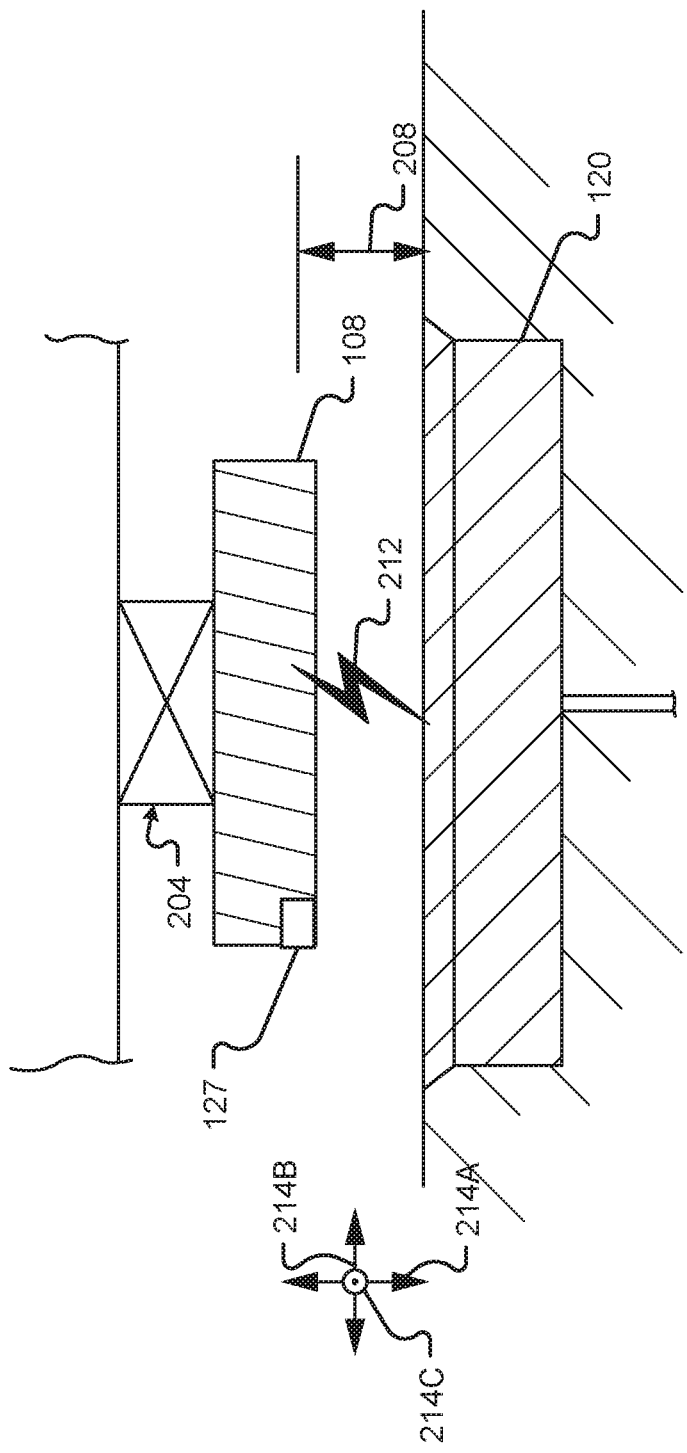
FIG. 2A shows a detail view of a vehicle charging panel in a charge receiving position adjacent to a power source in accordance with embodiments of the present disclosure.
Figure 2B:
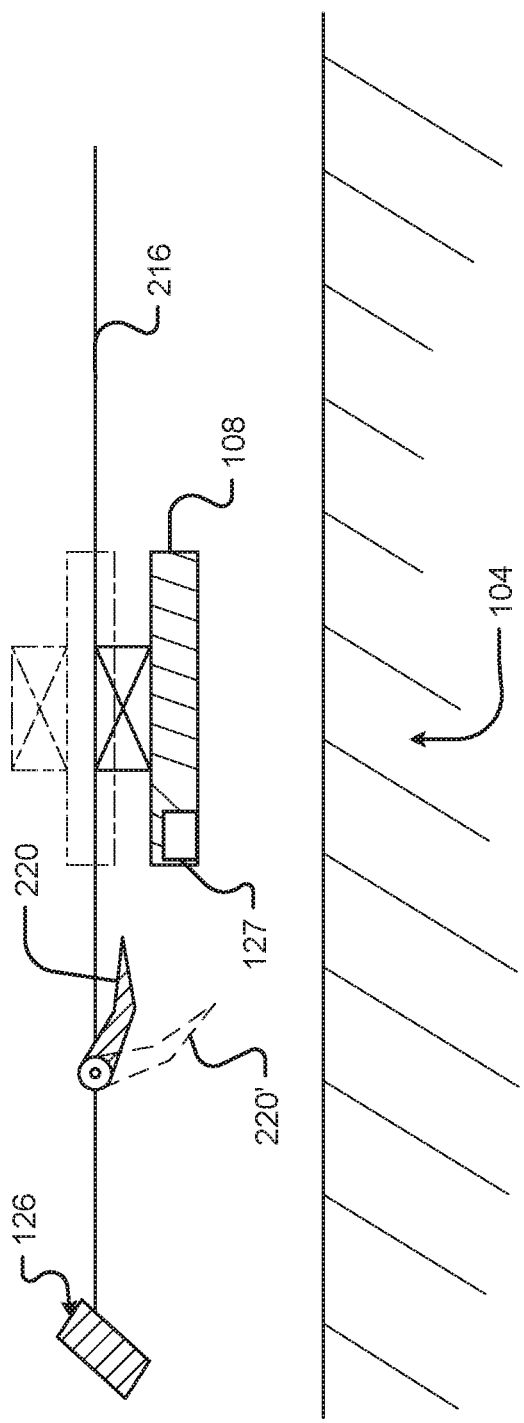
FIG. 2B shows a detail view of a vehicle charging panel in protected positions in accordance with embodiments of the present disclosure.

In some embodiments, mechanism, devices, and systems are described that selectively position the charging panel into position for receiving a charge 212 (e.g., the charge-receiving position). FIG. 2A shows a detail view of a vehicle charging panel 108 in a charge receiving position adjacent to a power source 120 in accordance with embodiments of the present disclosure. As provided herein, the charging panel 108 of a vehicle 100 may need to be deployed or moved into a position for receiving a charge 212. This position may be based on specific power transfer requirements, on a specific distance of the charging panel 108 relative to the charging area 120, safety requirements, and/or a designated distance of operation for effecting an electrical energy transfer, or charge 212, operation. While the charging panel 108 may be actuated from a retracted or concealed position into a deployed, or charge-receiving, position as described above, the charging panel 108 may need to be moved, at any time, in response to a detected condition. One example of the detected condition may be an obstacle, obstruction, object, natural condition, chemical, etc., and/or combination thereof that can potentially damage or otherwise contact the charging panel 108. By way of example, a charging panel 108 may be disposed on an exposed side of a vehicle 100 (e.g., the underside of the vehicle 100, etc.). When the charging panel 108 is actuated into a deployed position, the charging panel 108 may be vulnerable to damage from variations in a roadway or some other condition. Continuing this example, as a moving vehicle is receiving a charge, via a deployed charging panel 108, an object on the road 104 may contact and/or damage the charging panel 108. The embodiments described herein may account for variations in terrain, objects, and/or other conditions and selectively move the charging panel 108 from a deployed position to a concealed or at least partially concealed position. In some embodiments, and as shown in FIG. 2B, a shield 220 may be inserted or positioned between the object/hazard and the charging panel 108 to, among other things, prevent damage to the charging panel 108.

In one embodiment, the charging panel 108 and/or circuit may be distally disposed on an armature that is configured to hover over a charging circuit 116 in a roadway 104. Typically this distance 208 may be predetermined or preset for energy transfer requirements and/or safety (e.g. via query by controller 110 to database 113), however embodiments disclosed herein should not be so limited. In any event, the armature 204 may move in one or more dimensions and/or axes to maintain an optimal or preset distance 208 from the charging circuit 120 while preventing the charging panel 108 from impacting the roadway 104, environmental, and/or other hazards. In one embodiment, one or more sensors 126 may monitor the roadway 104 around a vehicle 100 (e.g., an area or volume of space ahead of or in proximity to a vehicle 100, etc.) at least at a detection distance from the armature 204. This sensor monitoring can allow the armature 204 to timely adjust position in response to at least one condition and/or hazard detected by the one or more sensors 126. Height or separation distance between a point on the charging panel 108 and the roadway surface 104 and/or charging panel 120 is provided by one or more separation sensors 127.

Rather than retract, or at least partially retract, the charging panel 108, a minor positional adjustment may be all that is required to avoid contact with an object or to avoid a hazard. In this embodiment, a movement controller (as contained in controller 110—see e.g. FIG. 6) may determine to move the charging panel 108 and/or armature 204 along a direction 214 parallel to the surface of the roadway. For instance, as a vehicle 100 is travelling along a path in a first direction 214B, a hazard may be detected in the path via the one or more sensors 126 described herein. Continuing this example, the sensor information may be used by a controller of the vehicle 100 to move the charging panel in a direction different 214A, 214C from the first direction 214B. The direction different 214A, 214C from the first direction 214B may be orthogonal to the first direction 214B. Additionally or alternatively, the direction different 214C (shown going into and coming out of the page in FIG. 2A) from the first direction may be along a plane that is parallel to the surface of, or hypothetical plane established by, the roadway 104. In any event, the minor positional adjustment to the charging panel 108 may be enough to avoid a collision, impact, and/or other contact with the hazard.

The charging panel 108 may be attached to at least one suspension component of the vehicle 100. In one embodiment, the charging panel 108 may be moved via a mechanical connection and based on a movement of at least one suspension element of the vehicle 100. In some embodiments, the movement may be driven by a mechanical and/or electrical component, actuator, linkage, solenoid, or other mechanism/device. In any event, the movement may be effected in response to detecting a mechanical movement of the suspension, the vehicle 100, and/or the roadway 104 relative to the charging panel 108, etc.

In some cases, a movement of the charging panel 108 may not be feasible or even possible. For instance, when a moving obstacle is detected as approaching the vehicle 100 at speed or an object comes dislodged from a portion of the vehicle 100, the charging panel 108 may not be capable of moving quick enough (e.g., from an exposed position to a completely, or at least partially, concealed position, etc.) to prevent impact. In any event, a shield 220 or protective panel may be actuated, deployed, inserted, or otherwise positioned into a position 220' between the obstacle/object and the charging panel 108. When in this position, the shield 220 may serve to absorb, deflect, or otherwise minimize the effect of an impact or shock. Positioning of the shield 220 may include a spring-loaded actuation, mechanical actuation, electrical actuation, gas actuation, fluid actuation, an explosive deployment (e.g., similar to an airbag or safety restraint system initiation and deployment, sodium azide, potassium nitrate, etc.), etc., and/or combinations thereof. The shield 220 positioning may be performed in a fraction of the time it takes the charging panel 108 to deploy and/or retract.

In one embodiment, one or more sensors 126 may be used to detect an obstacle, object, or other hazard. The one or more sensors 126 may include, but are in no way limited to, image sensors, radio frequency sensors, laser radar or ladar sensors, infrared sensors, mechanical sensors (e.g., strain gauges, pressure sensors, brush sensors, leaf spring sensors, cantilevered motion sensors, etc.), electrical energy sensors, etc., and/or combinations thereof. In some embodiments, an array of sensors 126 may be used to detect an object and determine, or extrapolate, a position of the object at a particular time. For instance, a rock may have been set into motion via making contact with a moving vehicle 100 travelling along a roadway 104. Continuing this example, the rock may be bouncing toward the side 216 of the electrical vehicle 100 having the deployed, or at least partially deployed, charging panel 108. The array of sensors 126 in this example may determine a trajectory of the rock. Using sensor provided information a controller of the vehicle may initiate a command to one or more of the movable armature 204, shield 220, charging panel deployment mechanism, retracting device, and/or other device to protect the charging panel from damage. As provided above, the protection of the charging panel 108 may include moving the charging panel 108 to an at least partially concealed position and/or moving a shield 220 into a position 220' that at least partially conceals the charging panel 108. The shield may be a brush, such as a wired cylindrical brush, to clear or receive debris such as roadway debris.

Figure 2C:
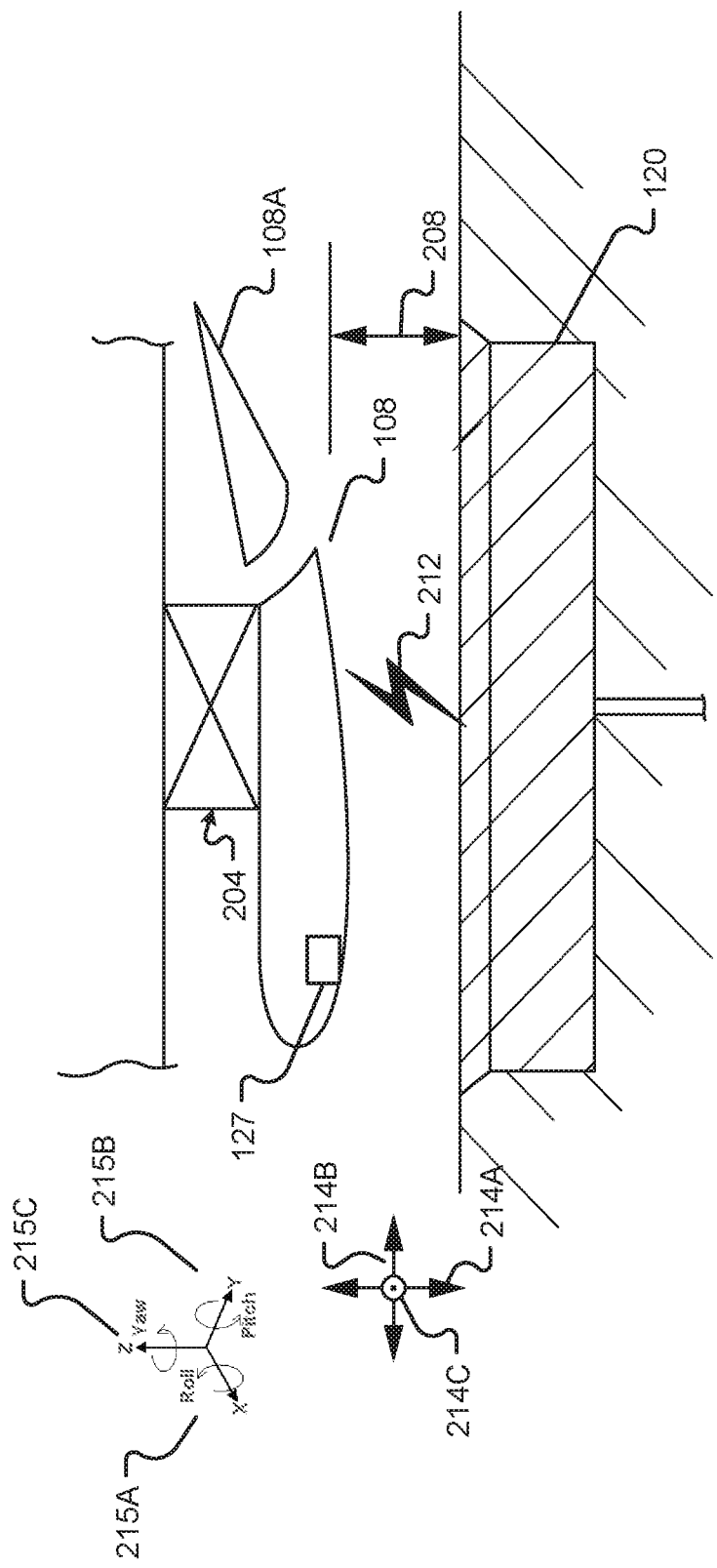
FIG. 2C shows a detail view of a vehicle charging panel in a charge receiving position adjacent to a power source in accordance with embodiments of the present disclosure.
Figure 4:
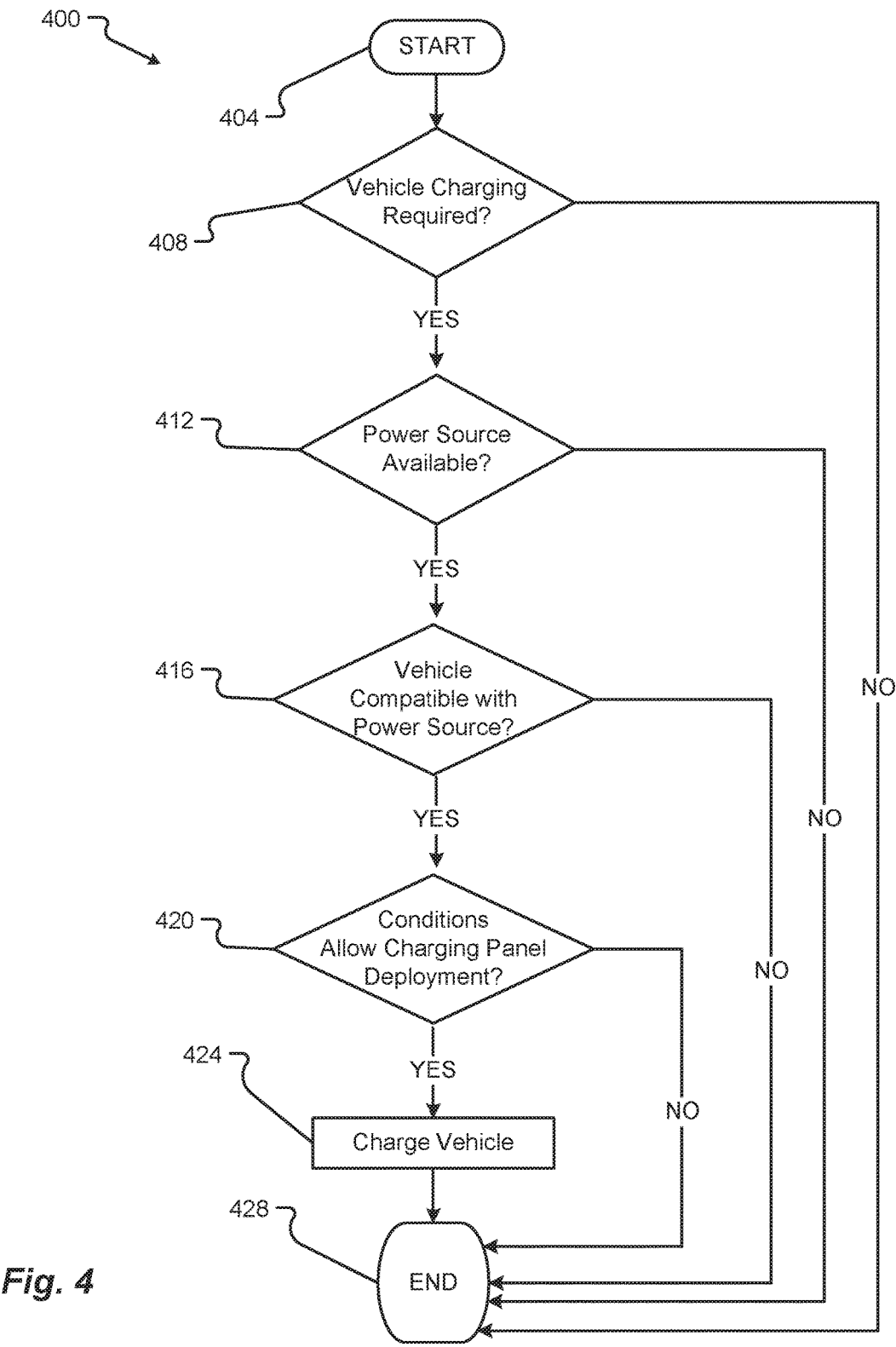
FIG. 4 is a flow or process diagram of a method of charging an electric vehicle.
Figure 5:
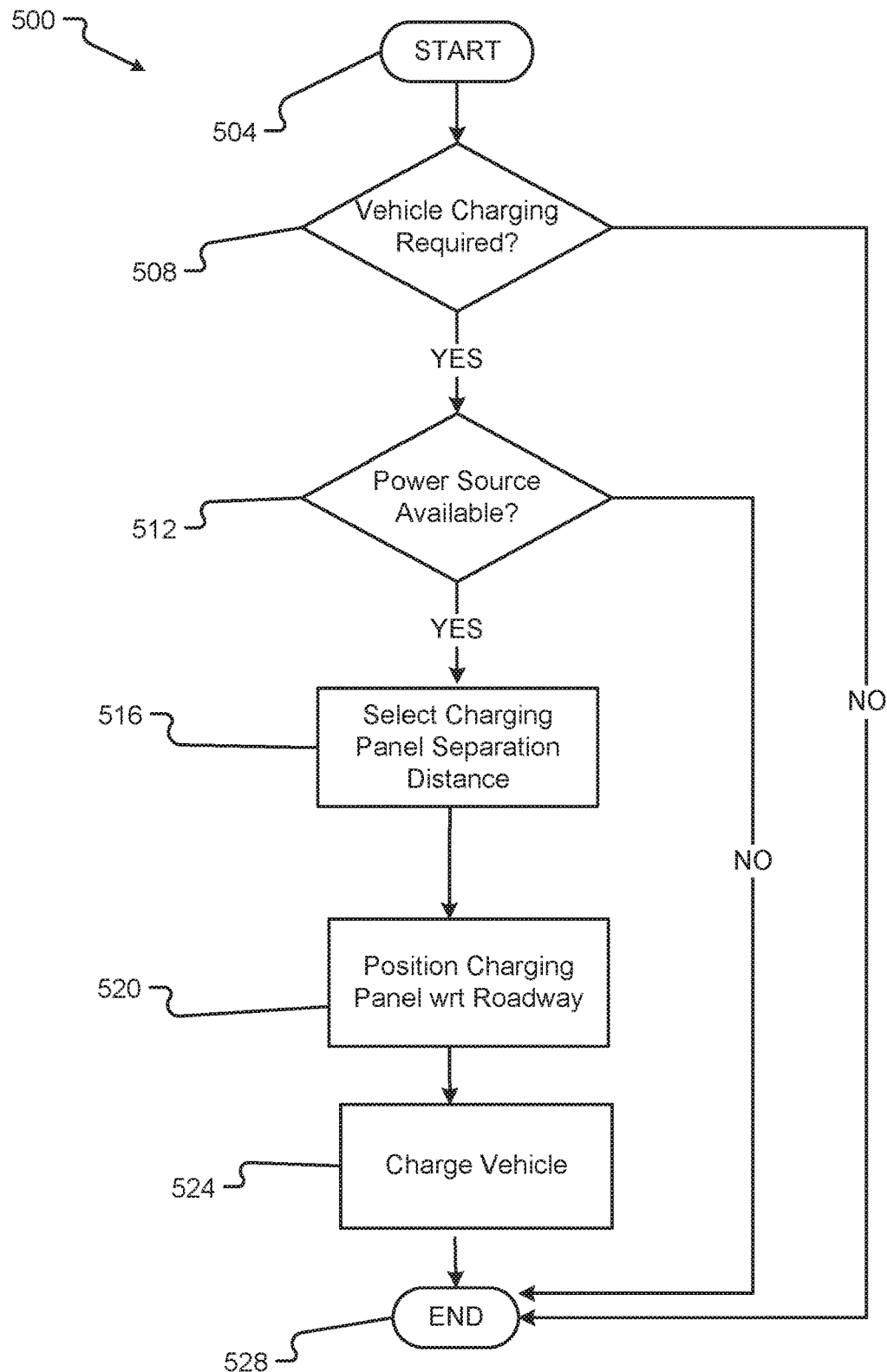
FIG. 5 is a flow or process diagram of a method of positioning a charging panel of an electrical vehicle to receive a charge.
Figure 6:
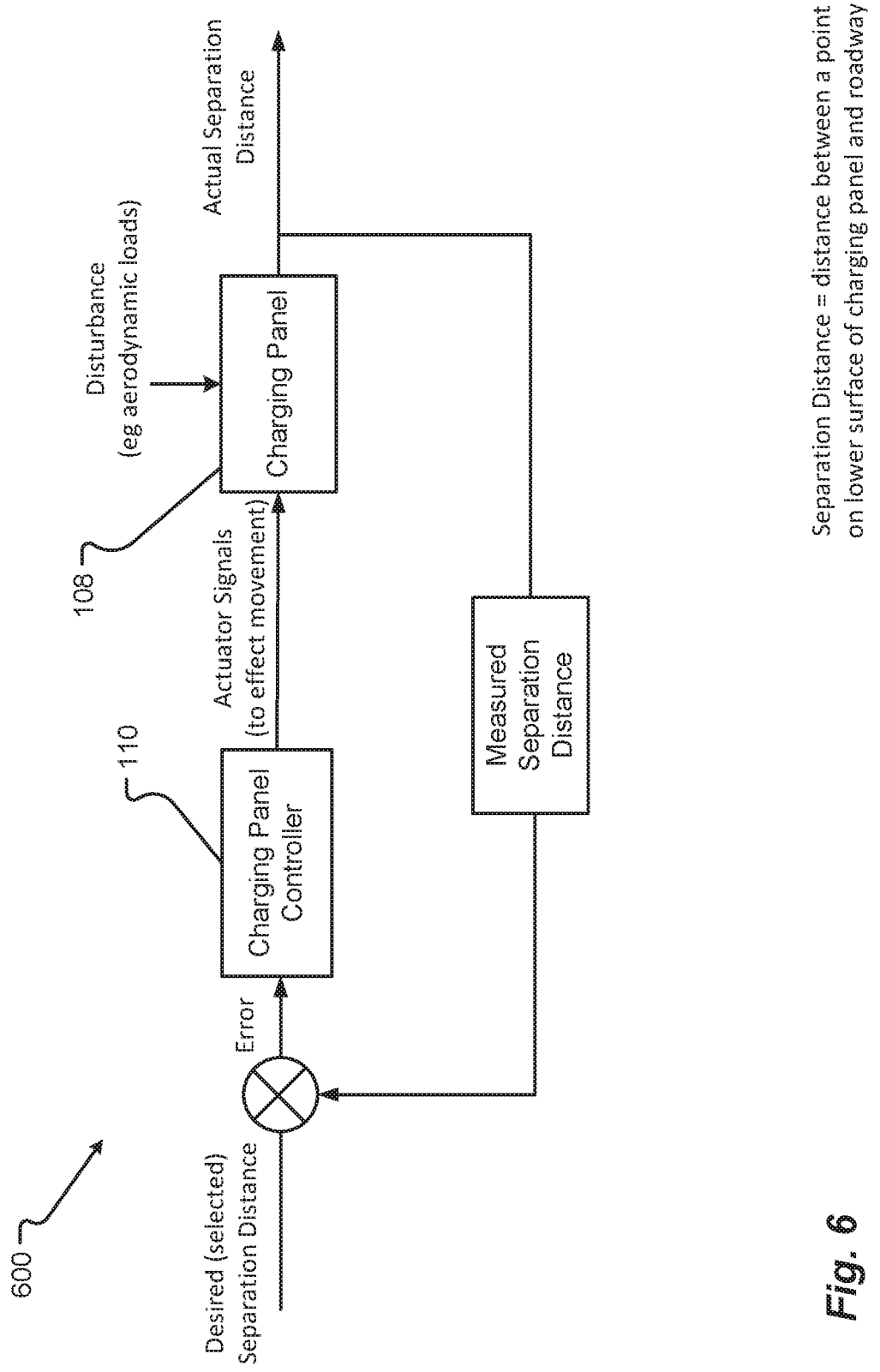
FIG. 6 is a block diagram of a charging panel control system.

FIG. 2C shows a detail view of a vehicle charging panel 108 in a charge receiving position adjacent to a power source wherein the charging panel is an airfoil shape. In this embodiment, the charging panel 108 may comprise an airfoil flap 108A. The airfoil shape in some situations may provided improved control and/or positioning and/or structural stability to the charging panel 108 with respect to maintaining charging distance to charging panel 120 (as embedded in a roadway or flush with a roadway surface). More specifically, when the vehicle 100 is moving at sufficient speed, aerodynamic forces or loads will be generated and imposed on any structures fitted between the bottom of the vehicle and the roadway. Furthermore, such nominal aerodynamic loads may be exasperated due to the relatively small distance between the lowered or deployed charging panel and the roadway causing the aerodynamic flow to be in ground effect (causing ever higher aerodynamic loads). As such, an airfoil shape will enable improved control on the aerodynamic loading on the charging panel and likely improved positioning stability. The movement or positioning of the charging panel 108, comprising 3-d translation (214A-C) and 3-d rotation (roll, pitch, yaw) may be controlled via controller 110 as enabled by one or more separation sensors 127. A loading sensor may further be configured to obtain loading at one or points on the charging panel. FIG. 6 details the operation of such a feedback control system for positioning of the charging panel 108. Note that sensor 127 would be disposed on armature 204 and/or charging panel 108 in a manner so as not to disturb the airfoil shape. Also, the flap 108A affords additional control. Furthermore, the manner in which charging panel 108 in mounted in FIG. 2C would nominal produce a downward lifting force on the panel 108 given the airfoils chamber relative to the roadway. The airfoil shape may also be mounted so as to produce an upward listing force. In other embodiments, alternative aerodynamic shapes are positioned upstream and/or downstream of the charging panel to improve airflow (eg straighten incoming airflow) or for other reasons as know to those skilled in the art.

FIG. 3 is a diagram of an embodiment of a data structure 114 for storing information about a charging panel configuration for given roadway types. The data structures are stored in vehicle database 113 and accessible by vehicle controller 110. The data contained in data structure 114 enables, among other things, for the vehicle controller 110 to initially position and to control the position of a deployed charging panel 108. Exemplar data may comprise panel type 115A meaning type of charging panel configured to vehicle comprising a flat panel (eg of FIGS. 2A-B and an airfoil e.g. of FIG. 2C); roadway type 115B e.g. an interstate (Colorado Interstate 25) or state highway e.g. Colorado Highway 36; a nominal recommended separation distance 115C between a set datum e.g. the lower surface of the panel and the roadway, e.g. 8 inches; a pitch angle 115D for the panel, a flap setting 115E (as appropriate), maximum vertical load 115F allowed to the charging panel; obstacle risk level 115G (this may allow tuning or adjustment of the sensitivity of obstacle sensor 126, e.g. signal/noise ratio of a radar sensor, or trip thresholds as to a forward obstacle detection); roadway power type 115H; and other 115I which may comprises if roadway is currently operational, costs of charging, etc. Further data fields 115N, 115M are possible.

With reference to FIGS. 1-3, FIG. 4 provides a flow chart illustrating an exemplary method of use of charging an electric vehicle 100 by way of the system 10. Generally, the method 400 starts at step 404 and ends at step 428.

After starting at step 404, at step 408 the method 400 queries as to whether charging is required by the electric vehicle 100. If charging is required, the method proceeds to step 412. If charging is not required, the method 400 proceeds to step 428 and the method 400 ends. At step 412, a query is made as to if a power source is available. That is, is the energy source (such as provided in a various charging area 120A-C) able to provide a charging service to electric vehicle 100. The query may be facilitated and/or determined by way of controller 110 and database 113. If NO (that is, no charging available), the method proceeds to step 428 and ends. If the result of the query of step 412 is YES, the method proceeds to step 416.

At step 416 a query is made as to whether the vehicle 100 and/or charge panel 108 is configured to receive the charging from power source. Such a query may be facilitated by communications between vehicle "smart" control systems (eg controller 110) of one or both of vehicle 100 and charging area 120A-C. The query may be facilitated and/or determined by way of controller 110 and database 113. Note that incompatibilities may include min/max energy transfer thresholds (eg voltages). If NO (ie the vehicle is incompatible with the power source) the method proceeds to step 428 and ends. If the result of the query of step 516 is YES, the method proceeds to step 420.

At step 420, a query is made to determine if conditions allow charging panel to be deployed. Here, database 113 may be queried to determine if power is available from a particular roadway. Additionally or alternatively, one or more sensors 126 may determine that an obstacle presents undue risk of damage to the charging panel so as to determine that conditions do not allow charging panel deployment. If the answer to query of step 420 is YES, the charging panel is deployed and the method continues to step

424. If NO the method proceeds to step 428 and ends. At step 424 the deployed charge panel 108 receives a charge and the method proceeds to step 528 wherein the method ends.

With reference to FIGS. 1-4, FIG. 5 provides a flow chart illustrating an exemplary method of positioning a charging panel 108 of an electrical vehicle 100 to receive a charge by way of the system 10. Generally, the method 500 starts at step 504 and ends at step 528.

After starting at step 504, at step 508 the method queries as to whether charging is required by the electric vehicle 100. If charging is required, the method proceeds to step 512. If charging is not required, the method 500 proceeds to step 528 and the method 500 ends. At step 512, a query is made as to if a power source is available. That is, is the energy source (such as provided in a various charging area 120A-C) able to provide a charging service to electric vehicle 100? The query may be facilitated and/or determined by way of controller 110 and database 113. If NO (that is no charging available), the method proceeds to step 528 and ends. If the result of the query of step 512 is YES, the method proceeds to step 516.

At step 516, the controller 110 queries the database 113 to determine the nominal conditions for deployment of the charging panel 108. For example (with regards to FIG. 3), if the charging panel is of type "Airfoil A4" and vehicle 100 is traveling on CO I-25, the charging panel is set to separation distance 8 inches and with pitch and flap at 0 degrees. The method then proceeds to step 520 wherein the charging panel 108 is positioned to the nominal set deployment conditions established in step 520. (In one embodiment, prior to step 520, a query is made, akin to step 420 of method 400, to determine if conditions allow for deployment of the charging panel.) At step 524 the deployed charge panel 108 receives a charge and the method proceeds to step 528 wherein the method ends.

FIG. 6 is a block diagram of a charging panel control system 600. Generally, the control system 600 is a feedback control system to control the separation distance between the charging panel 108 and the roadway (or more generally, the charging source). Selected separation distance is input (as determined by way of query to database 113 or manually entered by user) and compared with a measured separation distance (as from a separation distance sensor 127) to compute an error signal. The error signal is received by the controller 110 to determine control inputs to actuator of armature 204 which moves the charging panel 108. The error signal will typically be non-zero due to disturbances to the charging panel, such as aerodynamic loads generated while the vehicle is in motion. The controller 110 may employ any known types of feedback control known to those skilled in the art, comprising stochastic control, proportional, interal and/or derivative control, non-linear control and deterministic control. In other embodiments, a plurality of sensor 127 inputs are provided and/or a plurality of separation distances and/or loading measures are controlled. For example, a pair of positional sensors may be positioned at ends of the leading edge of an airfoil type charging panel whereby pitch and/or roll are controlled as well as distance from the roadway. Furthermore, a loading sensor may be positioned on the armature to measure the loading imparted to the armature shaft, so as to provide an ability to, for example, determine if a threshold value for do-not-exceed loading (as stored in database 113) has been exceeded.

In one embodiment, the charging area 120A-C and/or power source 116 provides notice to the vehicle 100, controller 110, and/or vehicle user that charging service is available and/or terms and conditions thereof. The notice may comprise targeted communications eg by texting to vehicles within a selectable distance. The content of the notice may comprise: the availability of charging, and terms and conditions of charging (cost, payment types, amount available, duration of charging time, etc). The notice may comprise a physical mounted advertisement that charging is available, not unlike a taxi "off duty" or "on duty" light mounted on a taxi rooftop.

In one embodiment, the charging panel 108 is maneuvered manually, e.g. by a vehicle user, a vehicle passenger, or an attendant at a stationary charging environment.

In one embodiment, the charging panel 108, through use of the feedback controller 110 described in one embodiment as FIG. 6, maintains a "terrain following" i.e. "TF" mode wherein the planar lower surface of the charging panel 108 maintains a constant height above (or "altitude") above the roadway surface. In the case of a truly flat or planar roadway, such a TF mode would only require vertical movement of the charging panel 108 in one variable (the separation distance 208), the one variable being a vertical distance. If the roadway is not truly planar (relative to the charging panel 108), perhaps due to a roadway crown or perhaps due to a slight roll in the vehicle posture due to non-uniformly inflated tires, then the controller 108 may maintain more than one variable. That is, perhaps a slight roll angle in addition to vertical height above the roadway. More specifically, a vehicle traveling in the USA in the right hand lane typically encounters a roadway crown that rises to the left toward the roadway centerline, thereby requiring a slight roll right configuration of the charging panel 108. As such, the controller would be maintaining both a roll position and a vertical height position. Such a multivariable feedback controller may be similar to that shown in FIG. 6 or, in some embodiments, of any design known to those skilled in the art. Note that roadway crown may, in one embodiment, be a data record maintained in database 113. Furthermore, vehicle sensors 126 may comprise one or more sensors able to measure roadway crown and/or other features of a non-planar roadway and/or a non-parallel relationship between the lower surface of the charging panel and the roadway (e.g. vertical distance sensors at each corner of the vehicle measuring distance from vehicle to the roadway).

Figure 7A:
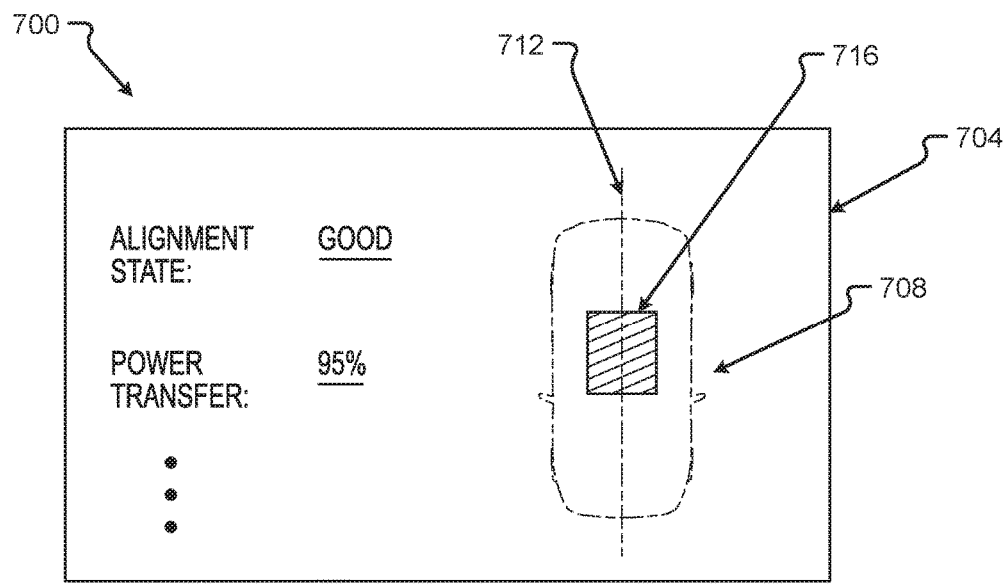
FIG. 7A shows a first state of a graphical user interface used in aligning a charging panel of an electrical vehicle to receive a charge.
Figure 7B:
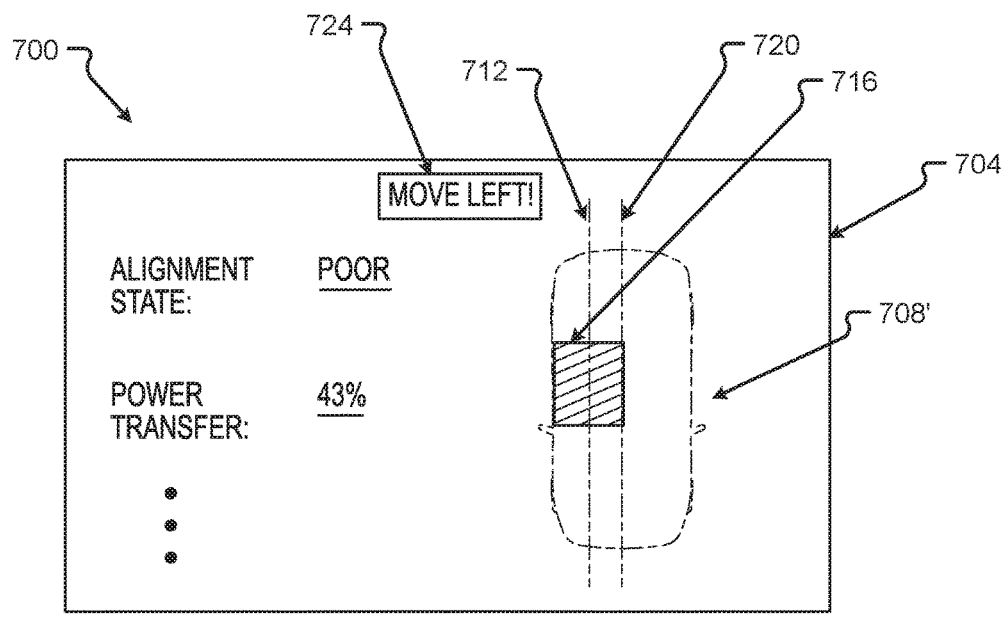
FIG. 7B shows a second state of the graphical user interface of FIG. 7A.
Figure 8:
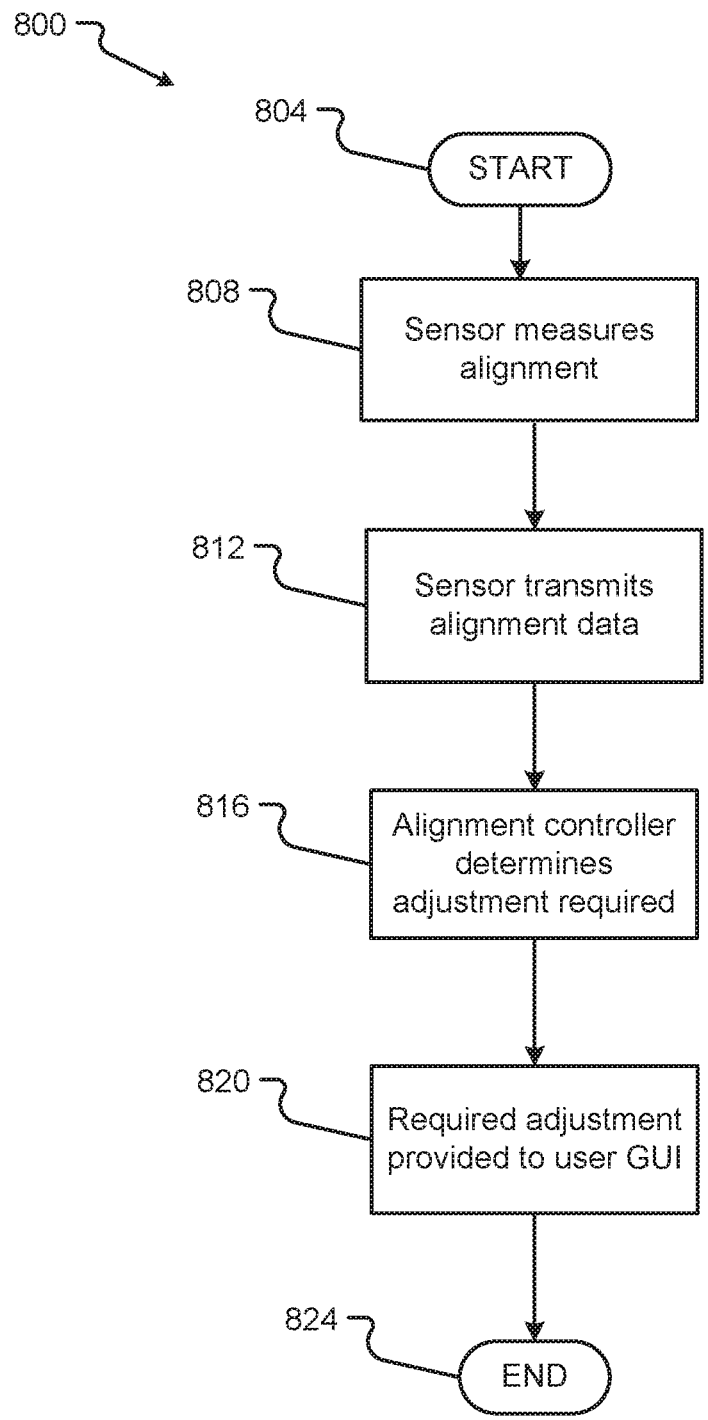
FIG. 8 is a flow or process diagram of a method of aligning a charging panel of an electrical vehicle to receive a charge.

FIGS. 7A-B show representative states of a graphical user interface (GUI) used in aligning a charging panel of an electrical vehicle to receive a charge. More specifically, FIGS. 7A-B depict graphical user interfaces 700 displaying feedback adjustment image one 708 and feedback adjustment image two 708' in accordance with embodiments of the present disclosure. In some embodiments, methods and systems are described that provide an electric vehicle 100 with the ability to properly align the charging panel 108 of the vehicle 100 over a charging circuit or power source 116. This system may continually and dynamically determine a position or location of the charging panel 108 relative to at least one of the charging circuit components aka power source 116. The dynamic position or location may be provided to a driver of the vehicle via at least one graphical user interface (GUI) 700 of a display device 704 to allow the driver to make any adjustments to the position of the vehicle 100 and/or the charging panel 108. For instance, the GUI 700 may show a vehicle image aka feedback adjustment image 708 relative to an alignment line, or centerline aka power source centerline icon 412, of an image representing a charging element aka power source icon 416. As the position of the charging panel 108, or vehicle 100, changes relative to the charging circuit components 116 the graphical output (e.g., showing the relative position of the components in the charging system, etc.) provided to the at least one GUI 700 changes (e.g., a changed representative image 708', of the vehicle 100 may move relative to the centerline 712 and/or image representing the charging element aka power source icon 716, or vice versa, etc.) to reflect the changed position. This continual updating of the GUI 700 and the relative charging components position can provide a driver of the vehicle 100 with a feedback loop by which the driver can adjust a position of the charging panel 108 and/or the vehicle 100 to obtain an optimal charging alignment between the charging panel 108 and the at least one charging circuit component 116. In some embodiments, a feedback recommendation aka alignment instruction 724 may be displayed to a portion of the GUI 700. For example, the feedback recommendation 724 may provide the driver with alignment instructions and/or advice for adjusting a position of the vehicle 100 relative to the charging circuit 116.

In some embodiments, alignment instructions may comprise more than a horizontal separation distance adjustments, e.g. both a horizontal and a vertical alignment or position instructions, or a horizontal alignment instruction and an angular position. The angular alignment adjustment may comprise a yaw alignment command, which may be particularly important if the vehicle is moving and the power sources are multiple sequential power sources embedded in a roadway.

The at least one charging circuit component 116 may be in communication with the vehicle, and/or a mobile device associated with a user of the vehicle 100 (e.g., the driver, etc.). In some embodiments, and as described above, where the electrical vehicle 100 can receive a charge while moving (e.g., in a moving charge area scenario, a static charging area disposed along a length of a travel path 104, etc., and/or combinations thereof) the relative position of the charging panel 108/vehicle 100 to the at least one charging circuit component 116 can be presented (e.g., via the GUI 400, etc.) to allow driving changes to be made and for the vehicle 100/charging panel 108 to be properly aligned. The orientation of the vehicle 100 and/or the charging panel 108 may be based on sensor input from one or more vehicle sensors and/or from one or more sensors exterior to the vehicle 100. In some embodiments, the alignment may be a function of an onboard application on the vehicle 100 or on a device (e.g., a mobile device of a vehicle driver, vehicle owner, etc.).

In some embodiments, the alignment feedback provided to the vehicle 100, the GUI 700, a driver of the vehicle 100, and/or other control component associated with the vehicle 100 may be used by a vehicle control system to automatically adjust the position of the vehicle 100 and/or the charging panel 108 relative to the at least one charging circuit 116. As provided herein, the position of the charging panel 108 may be required to be within an optimal charge range of the at least one charging circuit component 116. This optimal charge range may include a vertical distance between the charging panel 108 and the at least one charging circuit component 116 and/or a horizontal distance between a portion of the charging panel 108 and a portion of the at least one charging circuit 116. In some cases, the optimal charging range may include a distance 208 between a specific portion of the charging panel 108 and a specific portion of the at least one charging circuit 116. In any event, the optimal charging range may be defined as the position of the charging panel 108 relative to the at least one charging circuit component 116 that is capable of effecting an efficient transfer of energy. The optimal charging range, and similar charging parameters (e.g. separation distance between charging panel and roadway surface) may be stored in a database in or on the vehicle (e.g. vehicle database 113) or remotely, e.g. in the cloud. The efficient transfer of energy may include a percentage, an allowable loss amount, and/or other value defining the electrical energy transfer from the at least one charging circuit component 116 to the charging panel 108. As can be appreciated, this information may be displayed to the GUI 700.

With reference to FIGS. 1-7, FIG. 8 provides a flow chart illustrating an exemplary method of aligning a charging panel 108 of an electrical vehicle 100 to receive a charge by way of the system 10. Generally, the method 800 starts at step 804 and ends at step 824. After starting at step 804, at step 808 a sensor measures the alignment of the vehicle-mounted charging panel 108 with respect to the charging power source 116. The alignment sensor may be mounted on the vehicle 100 and/or on the ground, to include in proximity to the power source 116. The alignment sensor measures a distance between a centerline of the power source 116 and the centerline of the charging panel 108, for example a linear separation distance.

At step 812, the sensor transmits the sensor measurement data so as to be received by an alignment controller. The transmittal may be through any means known to those skilled in the art, such as by wireless communication. The sensor may transmit in an analog and/or digital manner. The sensor may be a plurality of sensors, and may broadcast at selected frequencies and/or power levels.

At step 816, the alignment controller receives the sensor measurement data and determines if any alignment required. For example, the sensor may provide that the linear separation distance is 0.5 meter, thereby determining that an alignment adjustment of 0.5 in a particular direction is required for optimal energy transfer between the charging panel 108 and the power source 116. The alignment controller may also determine additional data, such as the power efficiency between the charging panel 108 and the power source 116 (e.g. in FIG. 7B the power transfer efficiency is provided as 43%.) The alignment controller may provide text description as to directionality (e.g. move left or right) as provided by alignment instruction 724. The alignment controller may provide alignment data (e.g., comprising linear separation distance, power transfer level, directionality for improved alignment, etc) by way of a graphical user interface 700 and/or may automatically adjust the position of the vehicle and/or charging panel 108 for improved alignment. The alignment controller may provide signals to the actuator so as to minimize or eliminate the alignment error or alignment required, or to effect the movement of the charging panel via the actuator and/or armature. The alignment controller may provide signals to adjust the charging panel in more any of three translation positions and/or angular positions (as shown, e.g. in FIG. 2C.) The alignment controller may also perform signal processing to blend multiple measurements from one or more sensors. Furthermore, the alignment controller may also provide feedback control with respect to the linear separation, as described above with respect to FIG. 6. The method ends at step 824.

Figure 9:
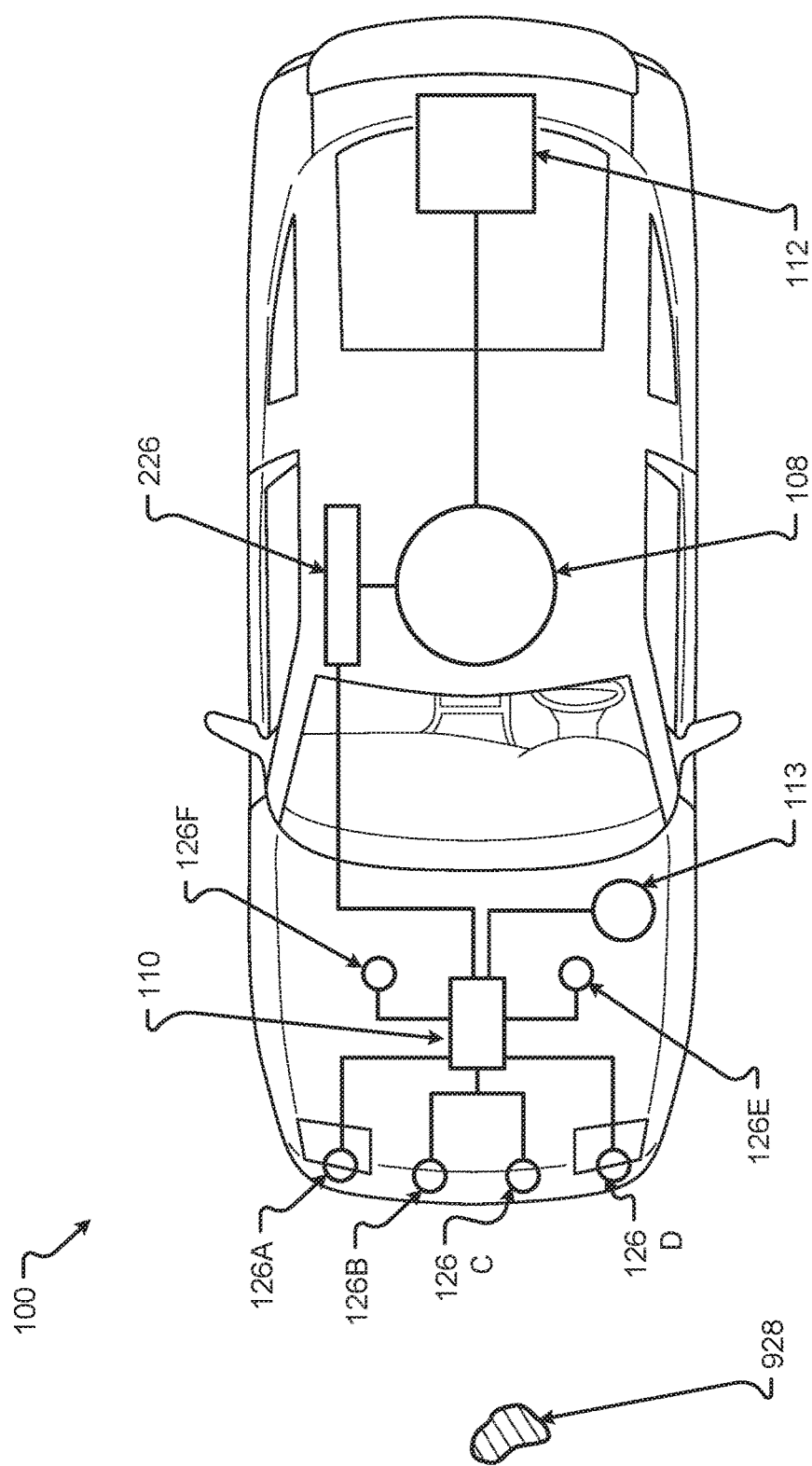
FIG. 9 shows a vehicle in a roadway obstacle environment in accordance with embodiments of the present disclosure.
Figure 10:
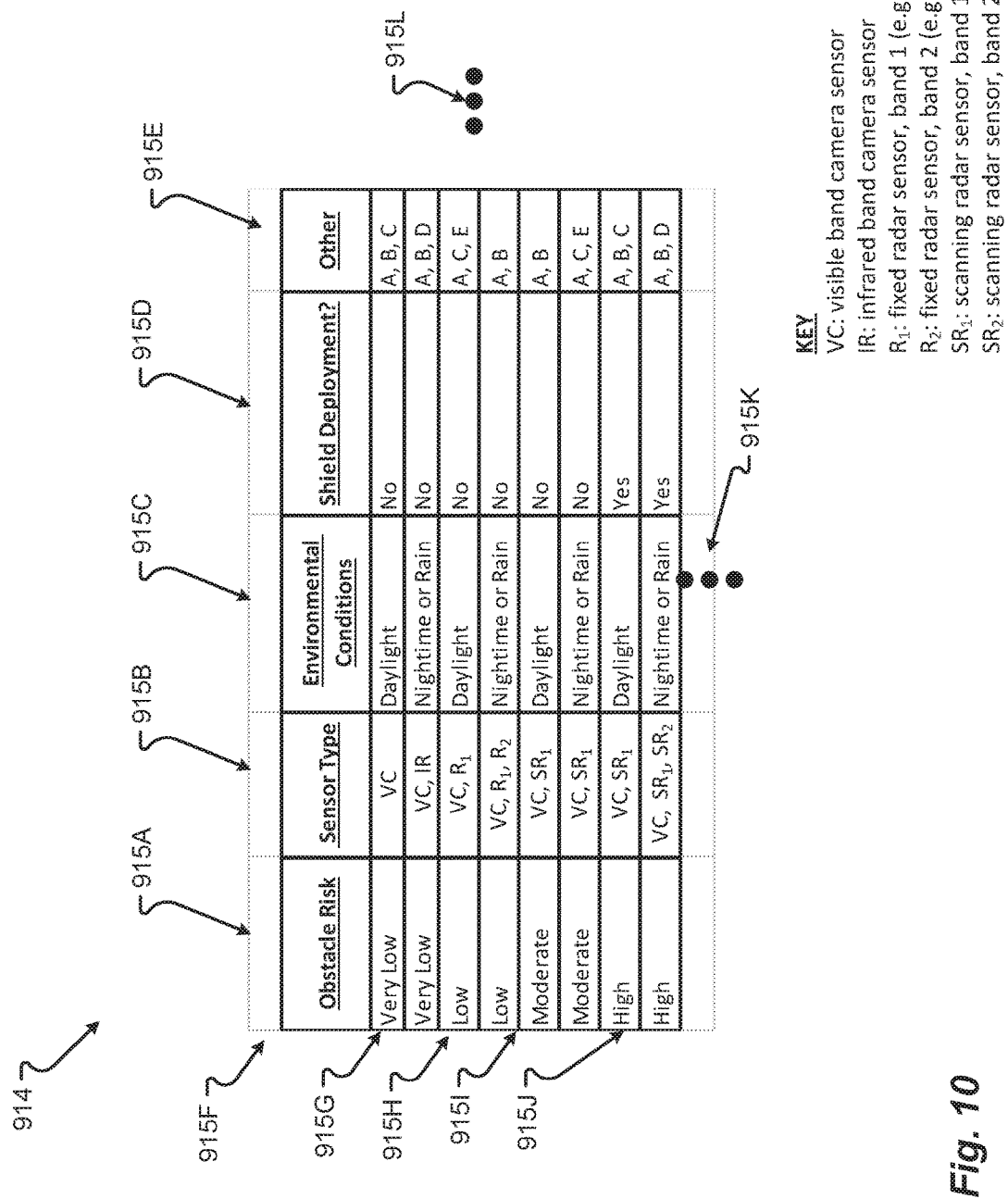
FIG. 10 is a diagram of an embodiment of a data structure for storing information about sensor configurations for given obstacle risk profile.
Figure 11:
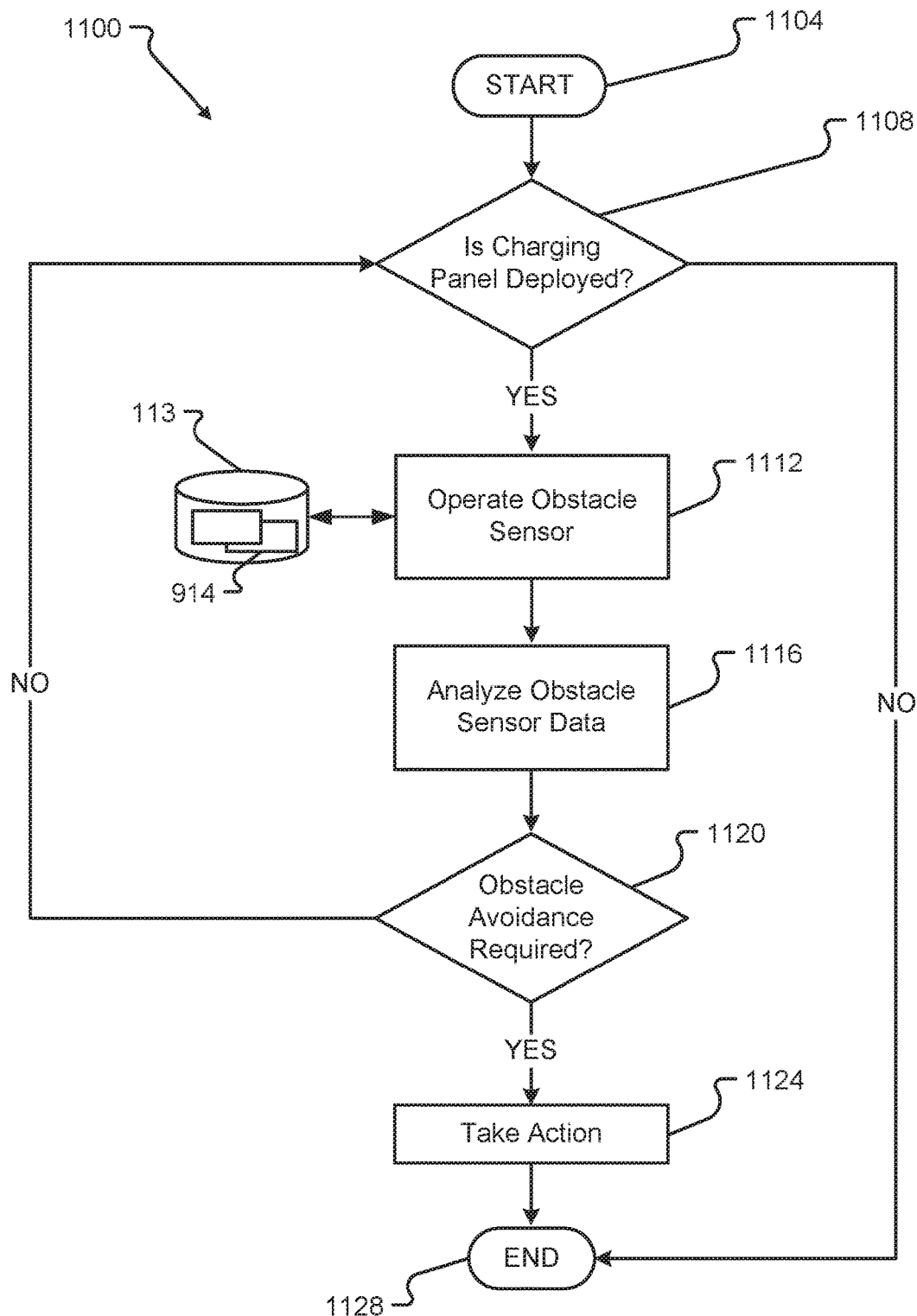
FIG. 11 is a flow or process diagram of a method of obstacle warning and avoidance.

FIGS. 9-11 describe aspects of an electric vehicle charging device obstacle avoidance system and method of use. Generally, FIG. 9 shows a vehicle in a roadway obstacle environment, FIG. 10 provides a diagram of an embodiment of a data structure for storing information about sensor configurations for a given obstacle risk profile, and FIG. 11 provides a flow or process diagram of a method of obstacle warning and avoidance.

In some embodiments, methods and systems are described that employ one or more sensors, (e.g., a sensor array, etc.) to warn of road hazards or obstacles 928. FIG. 9 shows a block diagram of a vehicle 100 and obstacle detection system in accordance with embodiments of the present disclosure. Similar, if not identical to the sensors 126 described above, the one or more sensors 126A-F may be road-focused radar, moving sensors, and/or other stationary or mounted sensors. In one embodiment, the sensors 126A-F may include one or more physically active sensors, including brush sensors, physical contact sensors, etc. These more physically active sensors may detect the obstacle and may even alter a condition associated with the obstacle 928. For instance, at least one physical component of the more active sensors may physically move obstacles 928, mitigate the effect of an impact of an obstacle 928, and/or even come into physical contact with those obstacles 928. In some cases, the physical contact with the obstacle 928 may produce the warning.

One example of a more active, or physical contact, sensor may include a wedge component, plow-shaped component, and/or deflecting member having a strain gauge attached thereto. In any event, the more active sensor may include a mechanical portion coupled thereto that is designed to contact an object 928. The contact with the object 928 may be measured as a stress, strain, electrical signal (e.g., potential difference, capacitance change, impedance, etc.), mechanical contact switch actuation, etc., and/or combinations thereof. In any event, upon detecting the contact, the sensor may provide a signal to a controller 110. The controller 110 may interpret the signal and determine to send a retraction command signal to one or more protective devices 226 configured to move and/or protect the charging panel 108. It is anticipated that the charging panel 108 may be made adjusted or moved (e.g., retracted, concealed, deployed, etc.), by the controller 110, in response to receiving and interpreting the detection signal within fractions of a second. In one example, the time between detecting the obstacle 928, or contact, and the controller 110 initiating a movement command configured to retract the charging panel 108 may be less than 300 milliseconds. In yet another example, the time between detecting the hazard 928, or contact, and the controller 110 initiating a movement command configured to retract the charging panel 108 may be less than 100 milliseconds.

FIG. 10 is a diagram of an embodiment of a data structure 914 for storing information about sensor configurations for given obstacle risk profiles. The data structures are stored in vehicle database 113 and accessible by vehicle controller 110. The data contained in data structure 914 enables, among other things, for the vehicle controller 110 to configure, operate, initially position and/or to control the one or more sensors 126, such as the sensors 126A-F depicted in FIG. 9. Exemplar data may comprise obstacle risk 915A, sensor type 915B, environmental conditions 915C, shield deployment 915D, and other 915E which may comprise further operational parameters of a given sensor. Further data fields 915K, 915L are possible.

Obstacle risk 915A may provide a measure of the relative risk or likelihood of obstacles or hazards that may present themselves to a deployed charging panel 108. For example, a roadway undergoing maintenance is more likely to present hazards (e.g. fallen barricade in the roadway, foreign objects such as bolts or other construction hardware in the road, etc) than one not undergoing such maintenance. Sensor type 915B may comprise any sensor types known to those skilled in the art to provide obstacle warning, comprising ladars, radars, and cameras of various bands such as IR and visible. Such sensors may comprise scanning sensors and fixed direction sensors, and may be controlled automatically, semi-automatically, or manually by an occupant of the vehicle. Additional characteristics of any particular sensor type may be provided in the Other 915E data field, providing characteristics comprising signal/noise ratios which influence valid "hits" or indicators of the presence of an object, sensitivity levels (ie "trip thresholds") for such obstacle detection hits, sensor power or energy or emission levels, scanning and/or dwell times or durations, frequency bandwidths, pulse characteristics (if a pulsed sensor) such as wavelength shapes (eg square pulse, etc), and shape of sensor emission (eg, fan shape or pencil-beam shape). Environmental conditions 915C may comprise visibility data (eg daylight, nighttime), humidity data (e.g. rain or fog). Shield deployment 915D may comprise on/off or yes/no deployment of a protective shield surrounding the charging panel (such a protective shield may produce unwanted aerodynamic drag and therefore not typically be deployed). Further parameters may comprise speed of vehicle (eg a higher speed may correlate to a higher obstacle risk level). Data structure 914 may be accessible automatically by controller 110 and/or by a vehicle user. Data structure 914 may comprise elements and characteristics of data structure 114.

With reference to FIGS. 1-10, FIG. 11 provides a flow chart illustrating an exemplary method of obstacle warning and avoidance. Generally, the method 1100 starts at step 1104 and ends at step 1128.

After starting at step 1104, at step 1108 the method 1100 queries as to whether the charging panel is deployed. (In one embodiment, the step 420 of method 400 are followed so as to determine if conditions allow the charging panel to be deployed.) In one embodiment, any deployment other than fully retracted/stowed results in a response of Yes. If the charging panel is deployed, the response to the query is a Yes and the method 1100 proceeds to step 1112. If the response to the query is a No, the method 1100 proceeds to step 1128 and the method 1100 ends.

At step 1112, the one or more obstacle sensors are operated. In one embodiment, the one or more sensors are simply turned on or activated. In other embodiments, such as depicted in FIG. 11, the method at step 1112 interacts with database 113 and associated sensor data structures 914 to configure the one or more sensors. Such interaction may occur automatically between controller 110 and database 113, or may be replaced or supplemented with vehicle occupant input. For example, a vehicle occupant, such as the driver, may input (through, for example, a dashboard graphical user interface or a mobile device such as a smartphone) his/her assessment of the obstacle risk and her requirement to activate a specific sensor in a specific manner. That is, the driver may request that MMW radar one and IR camera three be activated. The operation of the one or more sensors may involve occasional or recurring calibration operations (e.g. to provide ground truthing data so as to limit false positives and/or to truth a sensor against sensor data simply providing measurements to the roadway ahead). With the one or more sensors operating, the method 1100 proceeds to step 1116.

At step 1116, the received obstacle sensor data is analyzed. The analysis may occur by the controller 110, and may comprise any signal processing technique known to those skilled in the art, to include the types of control and/or signal processing algorithms described above in relation to FIG. 6. The received sensor data may require sensor fusion techniques, in particular in configurations where multiple measurements are provided of a particular location ahead or near the vehicle, either by a single sensor or a plurality of sensors or similar and/or different type. The method 1100 then proceeds to step 1120.

At step 1120, the method 1100 queries as to whether the analysis of step 1116 determined that a hazard or obstacle in the pathway of the vehicle 100 requires action. If the response to the query of step 1120 is No, the method 1100 returns to step 1108. If an action is required (that is, the response to the query is Yes and obstacle avoidance is required), the recommended action to effect is determined. The recommended action may be a function of the warning systems and/or damage prevention capabilities of the system 10. For example, if the obstacle is determined to be just within a selectable vehicle pathway perimeter, the action may be a visual and/or audio warning to the GUI and/or mobile device of a vehicle occupant. However, if the obstacle is determined to be a more severe threat (e.g. of large size and/or in a more central location relative to the vehicle pathway), the action may comprise immediately retracting the charging panel and/or issuing a visual and/or audio warning to take evasive action (eg bear left.) In some embodiments, the system automatically maneuvers the vehicle to attempt to avoid the obstacle. In some embodiments, the vehicle deploys one or more physically active elements, such as a protective cage surrounding the charging panel and/or one or more protective devices 226. The method 1100 then proceeds to step 1124.

At step 1124, the recommended action, as determined at step 1124, is executed. The method 1100 then proceeds to step 1128.

Figure 12:
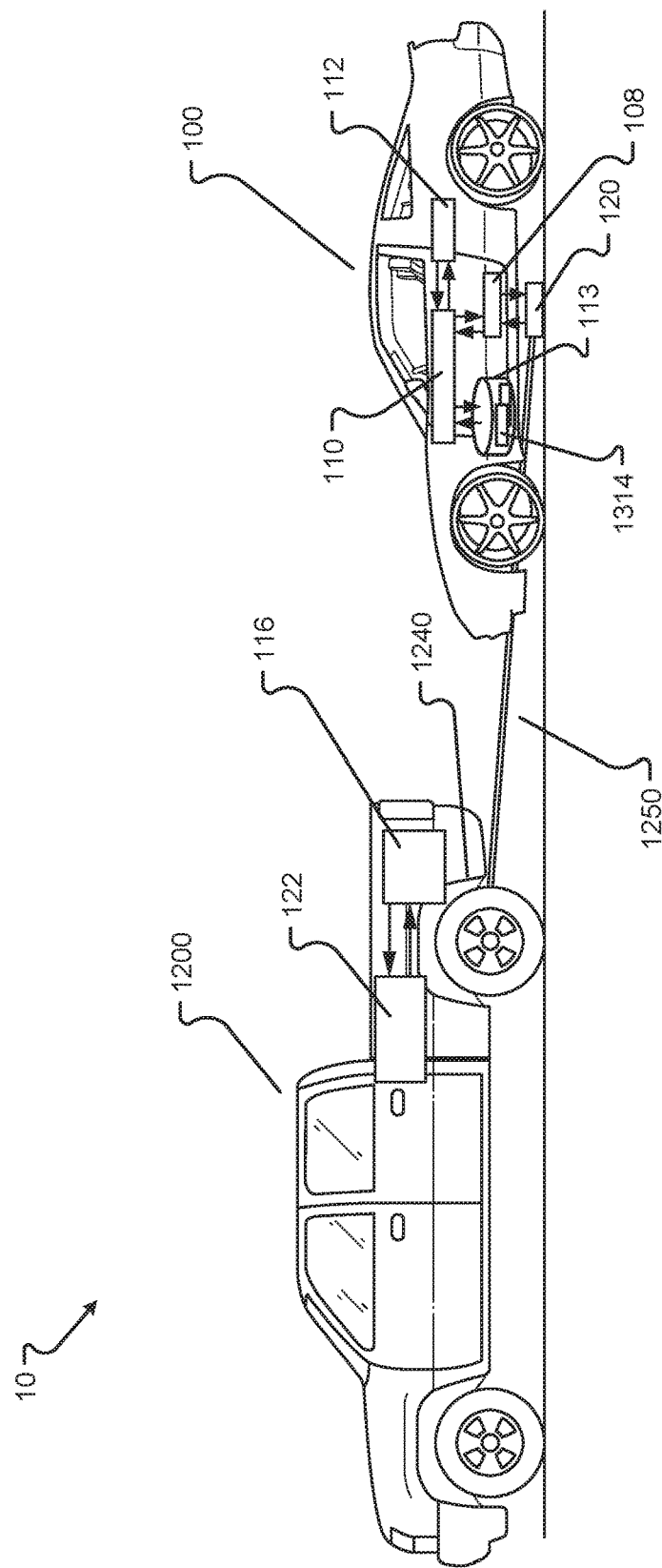
FIG. 12 shows a vehicle in an emergency charging environment in accordance with embodiments of the present disclosure.

FIG. 12 shows a vehicle in an emergency charging environment in accordance with embodiments of the present disclosure. Generally, in this embodiment of the invention, a specially-designed "tow truck" or other emergency assistance vehicle provides a charge to the electric vehicle. That is, the emergency vehicle comprises a charging panel or plate that deploys or extends so as to position below the electric (targeted) vehicle, wherein an emergency (or routine) charge is provided. The emergency vehicle can include a battery pack and a charging circuit to deliver a partial or complete charge to the vehicle. This vehicle may be the equivalent of AAA bringing a gallon of gas to a stranded motorist.

With reference to FIG. 12, an exemplar embodiment of a vehicle emergency charging system 100 comprising an emergency charging vehicle 1200 and charge receiver vehicle 100 is disclosed. The emergency charging vehicle 1200 is a road vehicle, such as a pick-up truck, as shown in FIG. 12. The emergency charging vehicle 1200 is configured to provide a charge to a charge receiver vehicle 100, such as an automobile, as shown in FIG. 12. The emergency charging vehicle 1200 comprises an energy source i.e. a charging power source 116 and a charge provider controller 122 in communication with the charging power source 116. The emergency charging vehicle 1200 provides a towed and/or articulated charger plate 120, as connected to the emergency charging vehicle 1200 by connector 1250. The connector 1250 may comprise a chain, rope, rigid or semi-rigid tow bar or any means to position charger plate 120 near the charging panel 108 of vehicle 100. Charge or power output of charging power source 116 is provided or transmitted to charger plate 120 by way of charging cable or wire 1240. In one embodiment, the charging cable 1240 is non-structural, that is, it provides little or no structural support to the connection between emergency charging vehicle 1200 and charging panel 108. Charging panel 108 (of vehicle 100) receives power from charger plate 120. Charger plate 120 and charging panel 108 may be in direct physical contact or not in direct physical contact, but must be at or below a threshold separation distance to enable charging, such as by induction. Charger plate 120 may comprise wheels or rollers so as to roll along roadway surface. Charger plate 120 may also not contact the ground surface and instead be suspended above the ground; such a configuration may be termed a "flying" configuration. In the flying configuration, charger plate may form an aerodynamic surface to, for example, facilitate stability and control of the positioning of the charging plate 120. Energy transfer or charging from the charger plate 120 to the charge receiver panel 108 is through inductive charging (i.e. use of an EM field to transfer energy between two objects). The charging panel 108 provides received power to energy storage unit 112 directly or by way of charging panel controller 110. In one embodiment, the receipt and/or control of the energy provided via the charging panel 108 is provided by charging panel controller 110.

Charging panel controller 110 may be located anywhere on charge receiver vehicle 100, to include, for example, the roof, side panel, trunk, hood, front or rear bumper and wheel hub of charge receiver 100 vehicle. In some embodiments, charging panel 108 may be deployable, ie may extend or deploy only when charging is needed. For example, charging panel 108 may typically stow flush with the lower plane of vehicle 100 and extend when required for charging. Similarly, charger plate 120 may, in one embodiment, not be connected to the lower rear of the emergency charging vehicle 1200 (as depicted in FIG. 12) by way of connector 1250 and may instead be mounted on the emergency charging vehicle 1200, to include, for example, the roof, side panel, trunk, hood, front or rear bumper and wheel hub of emergency charging vehicle 1200. Connector 1250 may be configured to maneuver connector plate 120 to any position on emergency charging vehicle 1200 so as to enable charging. Control of the charging and/or positioning of the charging plate may be manual, automatic or semi-automatic; said control may be performed through a GUI engaged by driver or occupant of receiving vehicle and/or driver or occupant of charging vehicle.

Figure 13:
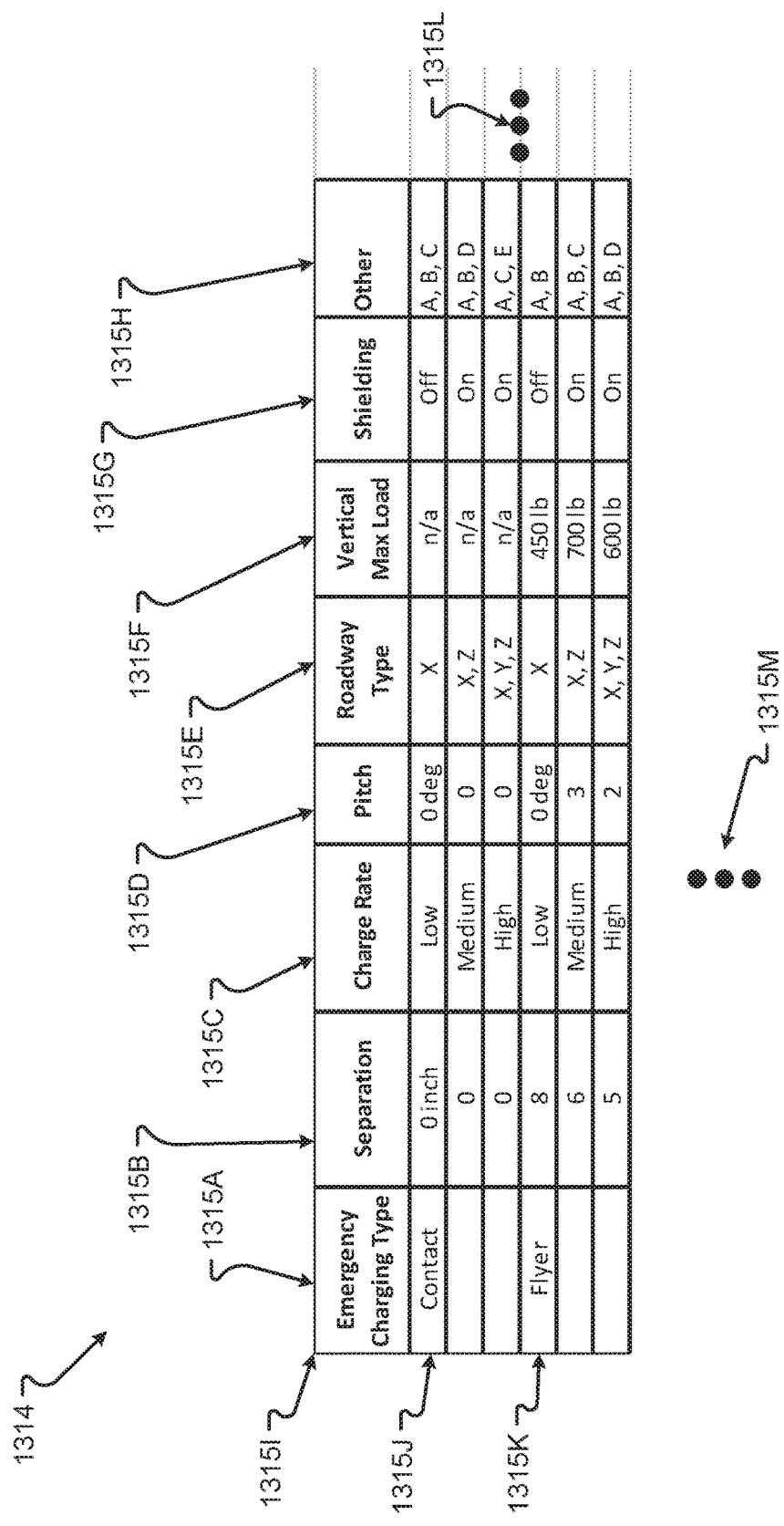
FIG. 13 is a diagram of an embodiment of a data structure for storing information about a charging panel configuration for given emergency charging environments.

FIG. 13 is a diagram of an embodiment of a data structure for storing information about an emergency charging panel configuration for given emergency charging environments. The emergency charging data structures 1314 are stored in vehicle database 113 and accessible by vehicle controller 110. The data contained in data structure 1314 enables, among other things, for the vehicle controller 110 to initially position and to control the position of a deployed charging panel 108 for given emergency charging type and/or conditions.

Exemplar data may comprise emergency charging type 1315A, meaning a "contact" or a "flyer" type of charging plate 120, as provided by emergency charging vehicle 1200. A contact charging type is a charging plate 120 that makes physical contact with the charging panel 108 of the electric vehicle 100. A flyer charging type is a charging plate 120 that does not make (intentional) physical contact with the charging panel 120 of the vehicle 100, but instead is suspended or flies above the roadway surface and below the charging panel 108. Note that one or both of charging plate 120 and charging panel 108 may be configured in various geometrical shapes, to include a flat panel and an airfoil (see, e.g. flat panel shape of FIGS. 2A-B and airfoil shape of FIG. 2C). A nominal recommended separation distance is provided as 1315B between a set datum e.g. the lower surface of the panel and the roadway, e.g. 8 inches. Charge rate 1315C may be set to numerical values or a qualitative value (e.g. low, medium, high which may correspond to a charging transmission level). A pitch angle 1315D for the charging panel 108 may be established, and roadway type 1315E (shown with characteristics comprising X, Y and Z representing roadway characteristics e.g. X may indicate a highway, Y may indicate a roadway with some active construction, and Z may indicate a roadway with significant crown). A maximum vertical load 1315F represents a maximum allowed to the charging panel 108. An on/off toggle of shielding is data item 1315G, which references deployment (i.e. "on") or non-deployment (i.e. "off" on stowed) of an EM shield cage at least partially surrounding charging panel 108. The Other data type of 1315H may comprise other data items involved in electrical charging such as voltage levels, current values, etc as known to those skilled in the art, and operational data such as costs of charging for a given emergency charging type or charging provider. Further data fields 1315L and 1315M are possible.

Figure 14:
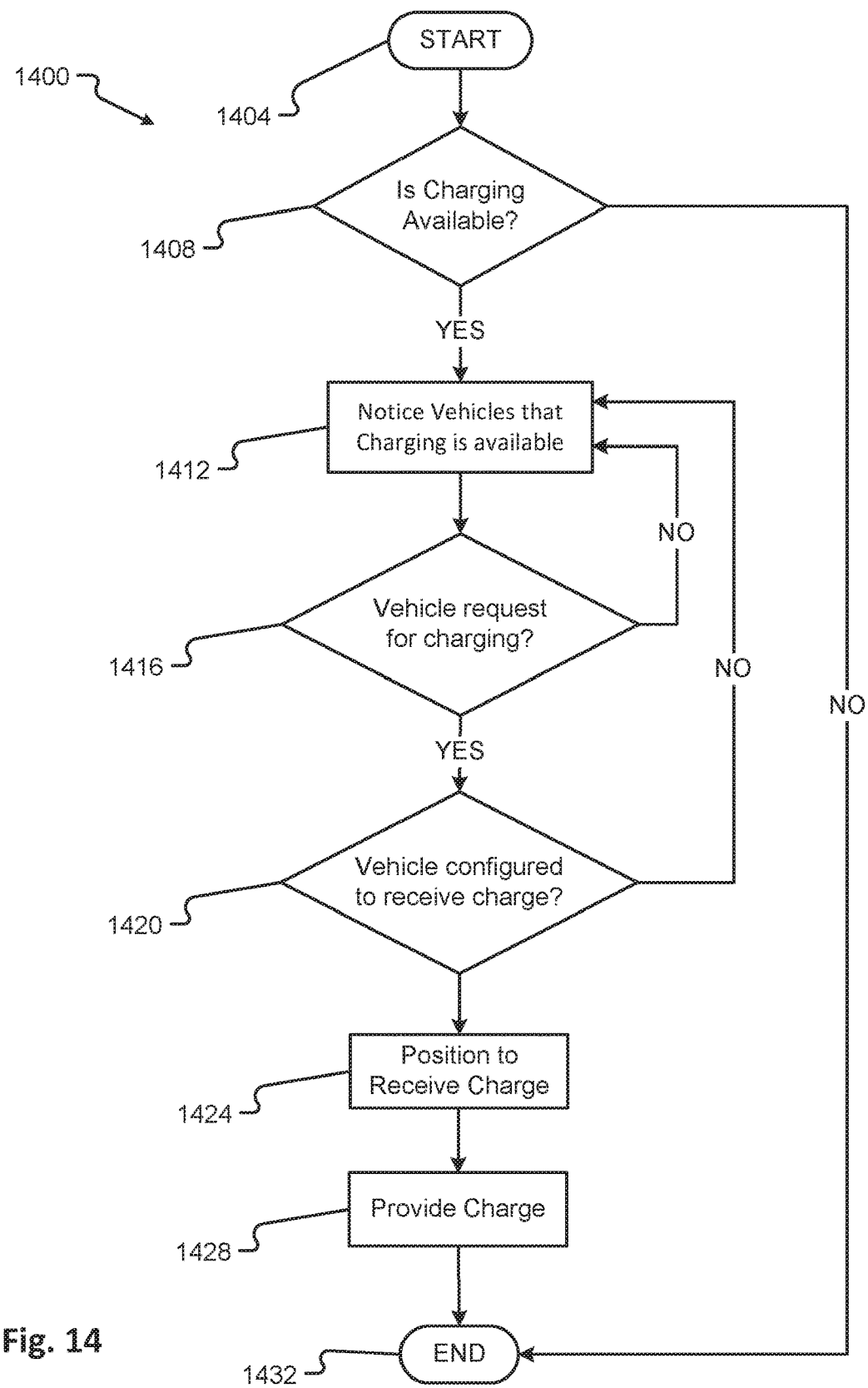
FIG. 14 is a flow or process diagram of a method of emergency charging from a roadway vehicle.

FIG. 14 provides an exemplar method of use 1400 of the emergency charging from a roadway vehicle system 100. The method starts at step 1404 and ends at step 1432.

After starting at step 1404, at step 1408 the method queries as to whether charging is available by emergency charging vehicle 1200. That is, a query is made as to whether the energy source (i.e. charging power source 116) is able to provide a charging service to a charging panel 108 of vehicle 100. If NO, the method proceeds to step 1432 and ends. (Alternatively, the vehicle 100 may return to a home base station or similar and recharge its energy source i.e. recharge energy storage unit 112.) If the result of the query of step 1408 is YES, the method proceeds to step 1412 wherein notice is provided (by one or more emergency charging vehicles 1200) that charging is available. The notice may comprise targeted communications e.g. by texting to vehicles 100 within a selectable distance. The content of the notice may comprise: the availability of charging, and terms and conditions of charging (cost, payment types, amount available, duration of charging time, etc). The notice may comprise a physical mounted advertisement (eg a lighted sign on emergency charging vehicle 1200) that charging is available, not unlike a taxi "off duty" or "on duty" light mounted on emergency charging vehicle 1200 rooftop.

At step 1416 a query is made as to whether vehicle 100 has requested or requires or seeks a charge. Note that charging panel controller 110 may monitor a state or status of charging (e.g. battery is charged at 32%, or battery charging level drops below a selectable threshold value e.g. below 10%) of the energy storage unit 112 of vehicle 100 to determine if charging is recommended or required. A user, such as a driver or passenger, may also request that the vehicle be charged. If NO, the method proceeds back to step 1412. If YES, the method proceeds to step 1420.

At step 1420, a query is made as to whether the charge receiver 100 vehicle is configured to receive the charging from emergency charging vehicle 1200. Such a query may be facilitated by communications between vehicle "smart" control systems aboard one or both of emergency charging vehicle 1200 and charge receiver vehicle 100, comprising communications between charge provider controller 122 and charging panel controller 110. Note that incompatibilities may include min/max energy transfer thresholds (e.g. voltages). If the query answer is a NO, the method proceeds to step 1412. If YES, the method proceeds to step 1424 wherein the charge receiver vehicle 100 is charged by emergency charging vehicle 1200 and the method proceeds to step 1424 wherein the charging panel 108 is positioned with respect to the charging plate 120 so as to receive (or transmit) a charge. The positioning of the charging plate 108 may comprise selection of initial or nominal positioning via data contained in vehicle database 113 through emergency charging data structure 1314 and emergency charging data structure fields 1315A-M. The method 1400 then continues to step 1428 wherein a charge is provided by power source 116 via charging plate 120 to charging panel 108 so as to power or charge energy source 112 or vehicle 100. (Note that in one embodiment, the vehicle 100 may alternatively or additionally provide a charge to the emergency vehicle 1200 via electrical energy transfer from charging panel 108 to charging plate 120.) When charging is complete the method 1400 ends at step 1432.

Figure 15:
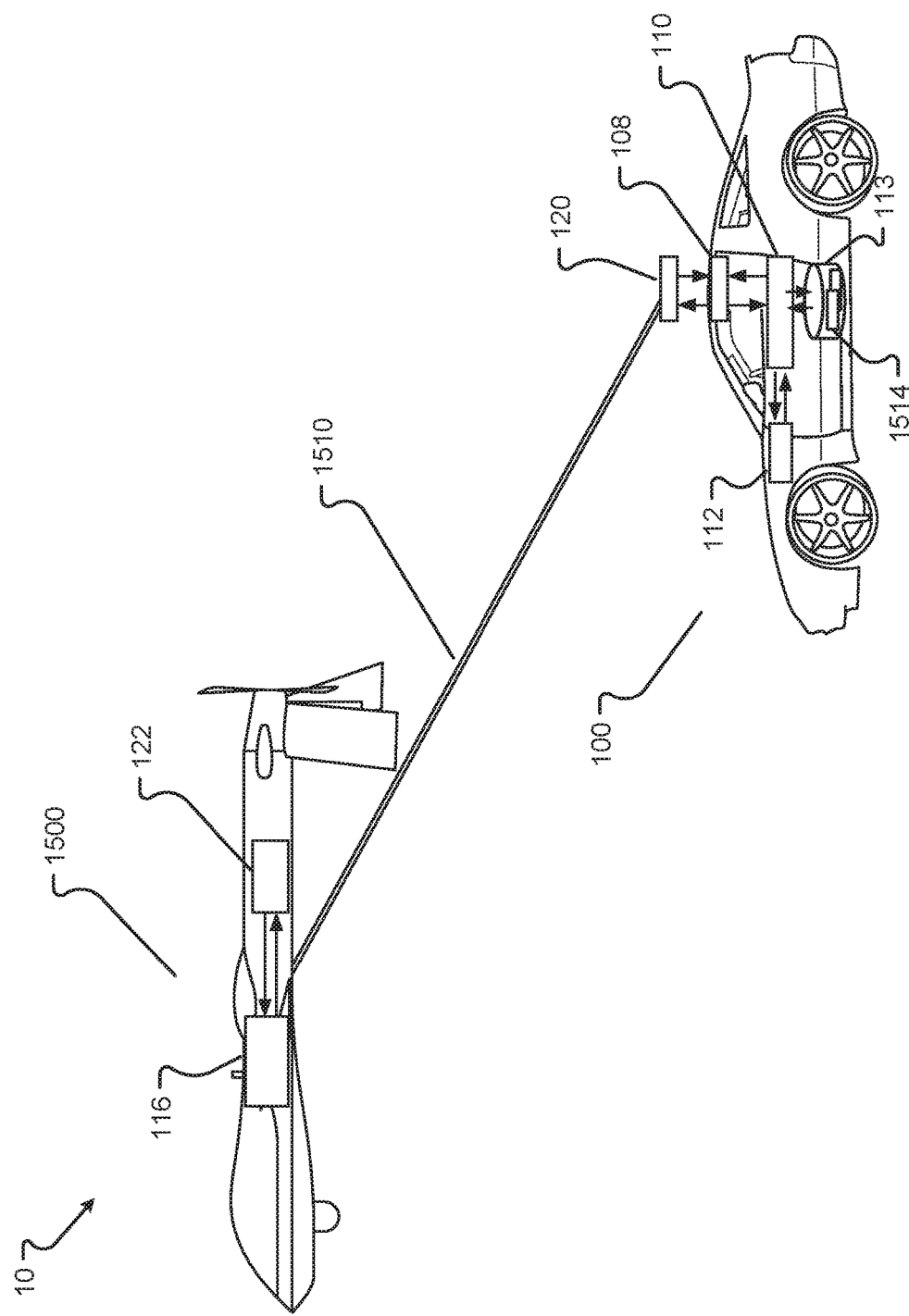
FIG. 15 shows a vehicle in an aerial vehicle charging environment in accordance with another embodiment of the present disclosure.

FIG. 15 shows a vehicle in an aerial vehicle charging environment in accordance with another embodiment of the present disclosure. Generally, this embodiment involves an aerial vehicle ("AV"), such as an Unmanned Aerial Vehicle (UAV), flying over or near a vehicle to provide a charge. The UAV may also land on the car to provide an emergency (or routine) charge. Such a charging scheme may be particularly suited for operations in remote areas, in high traffic situations, and/or when the car is moving. The AV may be a specially-designed UAV, aka RPV or drone, with a charging panel that can extend from the AV to provide a charge. The AV may include a battery pack and a charging circuit to deliver a charge to the vehicle. The AV may be a manned aerial vehicle, such as a piloted general aviation aircraft, such as a Cessna 172.

With reference to FIG. 15, an exemplar embodiment of a vehicle charging system 100 comprising a charge provider 200 configured as an aerial vehicle 1500, the aerial vehicle 1500 comprising a power source 116 and charge provider controller 122. The AV may be semi-autonomous or fully autonomous. The AV may have a remote pilot/operator providing control inputs. The power source 116 is configured to provide a charge to a charging panel 108 of vehicle 100. The power source 116 is in communication with the charge provider controller 122. The aerial vehicle 1500 provides a tether 1510 to deploy or extend charging plate 120 near to charging panel 108. The tether 1510 may comprise a chain, rope, rigid or semi-rigid tow bar or any means to position charging plate 120 near charging panel 108. For example, tether 1510 may be similar to a refueling probe used by airborne tanker aircraft when refueling another aircraft.

In one embodiment, the charging plate 120 is not in physical interconnection to AV 1500, that is, there is no tether 1510. In this embodiment, the charging plate 120 is positioned and controlled by AV 1500 by way of a controller on AV 1500 or in communication with AV 1500.

In one embodiment, the charging plate 120 position and/or characteristics (e.g. charging power level, flying separation distance, physical engagement on/off) are controlled by vehicle 100 and/or a user in or driver of vehicle 100.

Charge or power output of power source 116 is provided or transmitted to charger plate 120 by way of a charging cable or wire, which may be integral to tether 1510. In one embodiment, the charging cable is non-structural, that is, it provides zero or little structural support to the connection between AV 1500 and charger plate 120.

Charging panel 108 of vehicle 100 receives power from charger plate 120. Charging panel 108 and charger plate 120 may be in direct physical contact (termed a "contact" charger configuration) or not in direct physical contact (termed a "flyer" charger configuration), but must be at or below a threshold (separation) distance to enable charging, such as by induction. Energy transfer or charging from the charger plate 120 to the charging panel 108 is inductive charging (i.e. use of an EM field to transfer energy between two objects). The charging panel 108 provides received power to energy storage unit 112 by way of charging panel controller 110. Charging panel controller 110 is in communication with vehicle database 113, vehicle database 113 comprising AV charging data structure 1514 (detailed below and in FIG. 16).

Charging panel 108 may be located anywhere on vehicle 100, to include, for example, the roof, side panel, trunk, hood, front or rear bumper and wheel hub of vehicle 100. Charging panel 108 is mounted on the roof of vehicle 100 in the embodiment of FIG. 15. In some embodiments, charging panel 108 may be deployable, ie may extend or deploy only when charging is needed. For example, charging panel 108 may typically reside flush with the roof of vehicle 100 and extend when required for charging. Similarly, charger plate 120 may, in one embodiment, not be connected to AV 1500 by way of tether 1510 and may instead be mounted directly on the AV 1500, to include, for example, the wing, empennage, undercarriage to include landing gear, and may be deployable or extendable when required. Tether 1510 may be configured to maneuver charging plate 120 to any position on vehicle 100 so as to enable charging. In one embodiment, the AV 1500 may land on the vehicle 100 so as to enable charging through direct contact (i.e. the aforementioned contact charging configuration) between the charging plate 120 and the charging panel 108 of vehicle 100. Charging may occur while both AV 1500 and vehicle 100 are moving, while both vehicle 100 and AV 1500 are not moving (i.e. vehicle 100 is parked and AV 1500 lands on top of vehicle 100), or while vehicle 100 is parked and AV 1500 is hovering or circling above. Control of the charging and/or positioning of the charging plate 120 may be manual, automatic or semi-automatic; said control may be performed through a GUI engaged by driver or occupant of receiving vehicle 100 and/or driver or occupant of charging AV 1500.

FIG. 16 is a diagram of an embodiment of a data structure for storing information about a charging panel configuration for a given aerial vehicle charging environment, such as provided in FIG. 15. The AV charging data structures 1514 are stored in vehicle database 113 and accessible by vehicle controller 110. The data contained in data structure 1514 enables, among other things, for the vehicle controller 110 to initially position and to control the position of a charging panel 108 for given AV charging type and/or conditions.

Exemplar data may comprise emergency charging type 1315A, meaning a "contact" or a "flyer" type of charging plate 120, as provided by aerial vehicle 1500. A contact charging type is a charging plate 120 that makes physical contact with the charging panel 108 of the electric vehicle 100. A flyer charging type is a charging plate 120 that does not make (intentional) physical contact with the charging panel 120 of the vehicle 100, but instead is suspended or flies above the roadway surface and below the charging panel 108. Note that one or both of charging plate 120 and charging panel 108 may be configured in various geometrical shapes, to include a flat panel and an airfoil (see, e.g. flat panel shape of FIGS. 2A-B and airfoil shape of FIG. 2C). A nominal recommended separation distance is provided as 1515B between a set datum e.g. the lower surface of the panel and the roadway, e.g. 8 inches. Charge rate 1515C may be set to numerical values or a qualitative value (e.g. low, medium, high which may correspond to a charging transmission level).

A location 1515D identifies a location for charging, such as a stretch of roadway (e.g. "I-25 Hwy" to indicate Highway Interstate-25) or a static location for charging (e.g. "Spot A" or "Spot B" to alternative lat/long charging pad locations). The Stationary 1515E indicates options for moving or dynamic charging (where at least one of AV 1500 or vehicle 100 are in motion) identified as a "No" or a situation when both AV 1500 and vehicle 100 are stationary (identified as a "Yes" data element. Data items 1515F and 1515G identify weather conditions to permit AV charging. That is, Wx:Visibility$_{MIN}$ 1515F provides values for weather visibility minimums required to allow a given AV to provide charging. Wx:Winds$_{MAX}$ 1515G similarly provide maximum wind conditions wherein AV charging may occur. Such weather minimums are similar to those required and established by the FAA for flights operated under Visual Flight Rules ("VFR"). In one embodiment no AV charging is permitted unless conditions between vehicle 100 and AV 1500 meet or exceed FAA VFR minimums.

The Other data type of 1315H may comprise other data items involved in electrical charging such as voltage levels, current values, etc as known to those skilled in the art, and operational data such as costs of charging for a given emergency charging type or charging provider. Further data fields 1315L and 1315M are possible.

Figure 17:
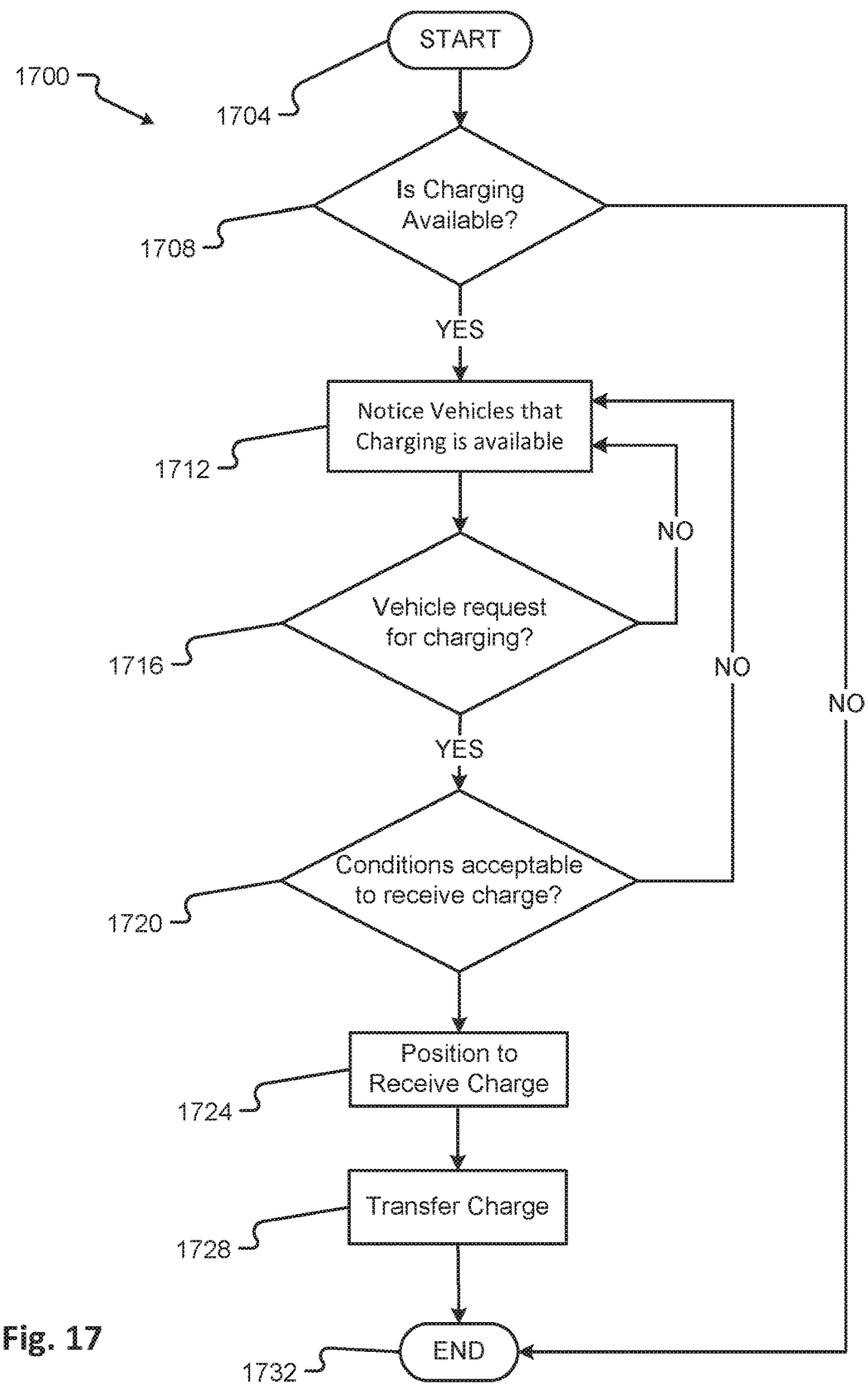
FIG. 17 is a flow or process diagram of a method of charging from an aerial vehicle.

FIG. 17 provides an exemplar method of use 1700 of the charging system 10 from an aerial vehicle 1500. The method starts at step 1704 and ends at step 1732.

After starting at step 1704, at step 1708 the method queries as to whether charging is available by aerial vehicle 1500. That is, a query is made as to whether the energy source (i.e. charging power source 116 of an aerial vehicle 1500) is able to provide a charging service to a charging panel 108 of vehicle 100. If NO, the method proceeds to step 1732 and ends. (Alternatively, the vehicle 100 may return to a home base station or similar and recharge its energy source i.e. recharge energy storage unit 112.) If the result of the query of step 1708 is YES, the method proceeds to step 1712 wherein notice is provided (by one or more aerial vehicles 1500) that charging is available. The notice may comprise targeted communications e.g. by texting to vehicles 100 within a selectable distance. The content of the notice may comprise: the availability of charging, and terms and conditions of charging (cost, payment types, amount available, duration of charging time, etc). The notice may comprise a physical mounted advertisement (eg a lighted sign on AV 1500, or a towed streamer) indicating that charging is available.

At step 1716 a query is made as to whether vehicle 100 has requested or requires or seeks a charge. Note that charging panel controller 110 may monitor a state or status of charging (e.g. battery is charged at 32%, or battery charging level drops below a selectable threshold value e.g. below 10%) of the energy storage unit 112 of vehicle 100 to determine if charging is recommended or required. A user, such as a driver or passenger, may also request that the vehicle be charged. If NO, the method proceeds back to step 1712. If YES, the method proceeds to step 1720.

At step 1720, a query is made as to whether conditions are acceptable for vehicle 100 to receive the charging from aerial vehicle 1500. Such a query may be facilitated by communications between vehicle "smart" control systems aboard one or both of aerial vehicle 1500 and charge receiver vehicle 100, comprising communications between charge provider controller 122 and charging panel controller 110. Conditions to be considered include weather conditions (as discussed above, e.g. VFR weather minimums) and also incompatibilities with respect to the AV 1500 and vehicle 100, such as min/max energy transfer thresholds e.g. voltages. If the query answer is a NO, the method proceeds to step 1712. If YES, the method proceeds to step 1724 wherein the charge receiver vehicle 100 is charged by aerial vehicle 1500 and the method proceeds to step 1724 wherein the charging panel 108 is positioned with respect to the charging plate 120 so as to receive (or transmit) a charge. Note that positioning the charging panel 108 may alternatively or additionally include positioning the vehicle 100 at a desired or selected location, such as a "spot A" location of data item 1515D of FIG. 16. The positioning of the charging plate 108 may comprise selection of initial or nominal positioning via data contained in vehicle database 113 through AV charging data structure 1514 and AV charging data structure fields 1515A-M. The method 1700 then continues to step 1728 wherein a charge is transferred, either by power source 116 via charging plate 120 to charging panel 108 so as to power or charge energy source 112 or vehicle 100, or vice versa. That is, in one embodiment, the vehicle 100 may alternatively or additionally provide a charge to the AV 1500 via electrical energy transfer from charging panel 108 to charging plate 120. When charging is complete the method 1700 ends at step 1732.

Figure 18:
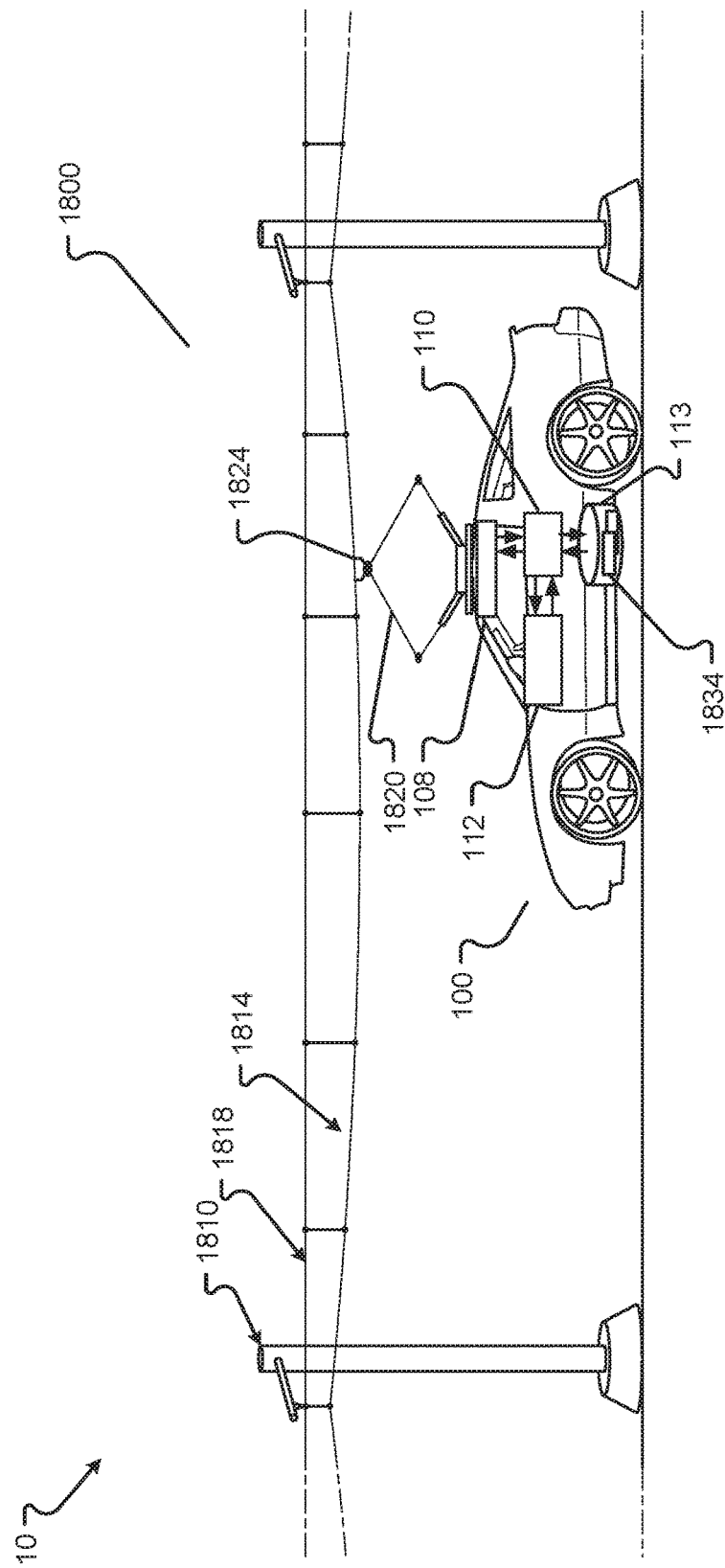
FIG. 18 shows a vehicle in an overhead charging environment in accordance with another embodiment of the present disclosure.

FIG. 18 shows a vehicle 100 in an overhead charging environment in accordance with another embodiment of the present disclosure. Generally, in this embodiment of the invention, charging occurs from an overhead towered charging system 1800, similar to existing commuter rail systems. Such an overhead towered system 1800 may be easier to build and repair compared to in-roadway systems. Generally, the invention includes a specially-designed roadway charging system 1800 comprising an overhead charging cable or first wire 1814 that is configured to engage an overhead contact 1824 which provides charge to charging panel 108 which provides charge to vehicle energy storage unit 112. The roadway charging system 1800 may further comprise second wire 1818 to provide stability and structural strength to the roadway charging system 1800. The first wire 1814 and second sire 1818 are strung between towers 1810.

The overhead charging cable or first wire 1814 is analogous to a contact wire used to provide charging to electric trains or other vehicles. An external source provides or supplies electrical power to the first wire 1814. The charge provider comprises an energy source i.e. a provider battery and a provider charge circuit or controller in communication with the provider battery. The overhead charging cable or first wire 1814 engages the overhead contact 1824 which is in electrical communication with charge receiver panel 108. The overhead contact 1824 may comprise any known means to connect to overhead electrical power cables, such as a pantograph 1820, a bow collector, a trolley pole or any means known to those skilled in the art. Further disclosure regarding electrical power or energy transfer via overhead systems is found in US Pat. Publ. No. 2103/0105264 to Ruth entitled "Pantograph Assembly," the entire contents of which are incorporated by reference for all purposes. In one embodiment, the charging of vehicle 100 by overhead charging system 1800 via overhead contact 1824 is by any means know to those skilled in the art, to include those described in the above-referenced US Pat. Publ. No. 2103/0105264 to Ruth.

The overhead contact 1824 presses against the underside of the lowest overhead wire of the overhead charging system, i.e. the overhead charging cable or first wire 1814, aka the contact wire. The overhead contact 1824 may be electrically conductive. Alternatively or additionally, the overhead contact 1824 may be adapted to receive electrical power from overhead charging cable or first wire 1814 by inductive charging.

In one embodiment, the receipt and/or control of the energy provided via overhead contact 1824 (as connected to the energy storage unit 112) is provided by receiver charge circuit or charging panel controller 110.

Overhead contact 1824 and/or charging panel 108 may be located anywhere on vehicle 100, to include, for example, the roof, side panel, trunk, hood, front or rear bumper of the charge receiver 100 vehicle, as long as the overhead contact 1824 may engage the overhead charging cable or first wire 1814. Charging panel 108 may be stationary (e.g. disposed on the roof of vehicle 100) or may be moveable, e.g. moveable with the pantograph 1820. Pantograph 1820 may be positioned in at least two states comprising retracted and extended. In the extended state pantograph 1820 engages first wire 1814 by way of the overhead contact 1824. In the retracted state, pantograph 1820 may typically reside flush with the roof of vehicle 100 and extend only when required for charging. Control of the charging and/or positioning of the charging plate 108, pantograph 1820 and/or overhead contact 1824 may be manual, automatic or semi-automatic (such as via controller 110); said control may be performed through a GUI engaged by driver or occupant of receiving vehicle 100 and/or driver or occupant of charging vehicle.

Figure 19:
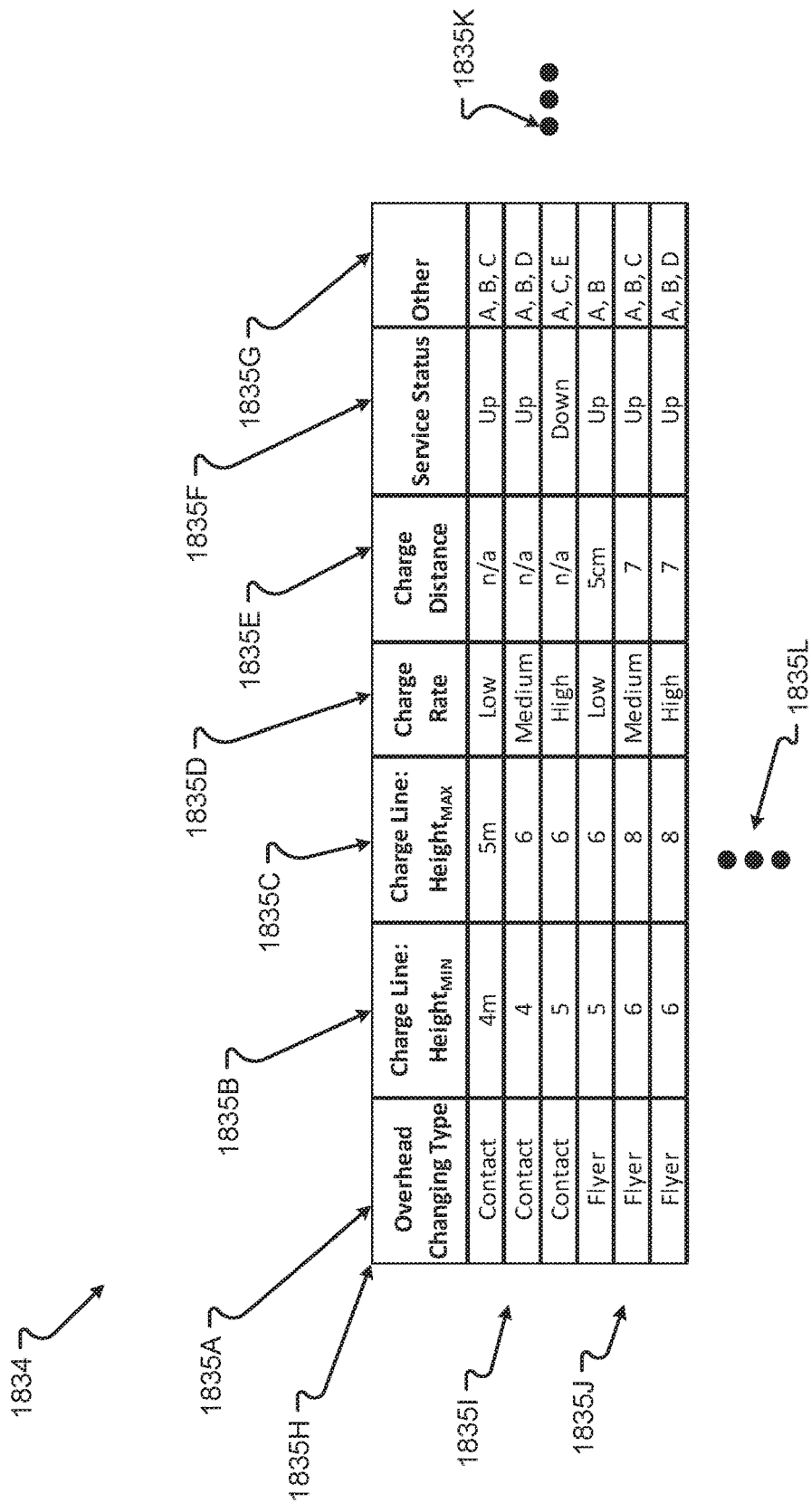
FIG. 19 is a diagram of an embodiment of a data structure for storing information about a charging configuration for a given overhead charging environment.

FIG. 19 is a diagram of an embodiment of a data structure for storing information about vehicle charging operations and configurations for given overhead charging environments. The overhead charging data structures 1834 are stored in vehicle database 113 and accessible by vehicle controller 110. The data contained in data structure 1834 enables, among other things, for the vehicle controller 110 to initially position and to control the position of overhead contact 1824 and/or charging panel 108 for given overhead charging type and/or conditions.

Exemplar data may comprise overhead charging type 1835A, meaning a "contact" or a "flyer" type of overhead contact 1824 and/or charging panel 108, as provided by overhead charging system 1800. A contact charging type is an overhead charging system 1800 that requires contact between overhead contact 1824 and first wire 1814. A flyer charging type is an overhead charging system 1800 that does not require contact between overhead contact 1824 and first wire 1814. A minimum charge line height distance and a maximum charge line height distance are provided as 1835B and 1835C, respectively. Such heights define height ranges of first wire 1814, thereby establishing constraints wherein a given vehicle 100, via pantograph, may or may not be structurally able to engage the first wire 1814 to receive charging.

Charge rate 1835D may be set to numerical values or a qualitative value (e.g. low, medium, high which may correspond to a charging transmission level). A charge distance 1835E is applicable for overhead charging types 1835A of flyer type, wherein contact is not required between overhead contact 1824 and first wire 1814. Charge distance 1835E may provide a threshold distance wherein charging is enabled between first line 1814 and overhead contact 1824. In such operations, charging may be provided through induction. Service status 1835F provides an status of the overhead charging system 1800, i.e. "up" indicates that the overhead charging system is operational and available to provide charging to vehicle 100, and "down" indicates that the overhead charging system 1800 is not available for charging a vehicle 100, such as caused by maintenance requirements.

The Other data type of 1835G may comprise other data items involved in electrical charging such as voltage levels, current values, etc as known to those skilled in the art, and operational data such as costs of charging for a given emergency charging type or charging provider. Further data fields 1835K and 1835L are possible.

Figure 20:
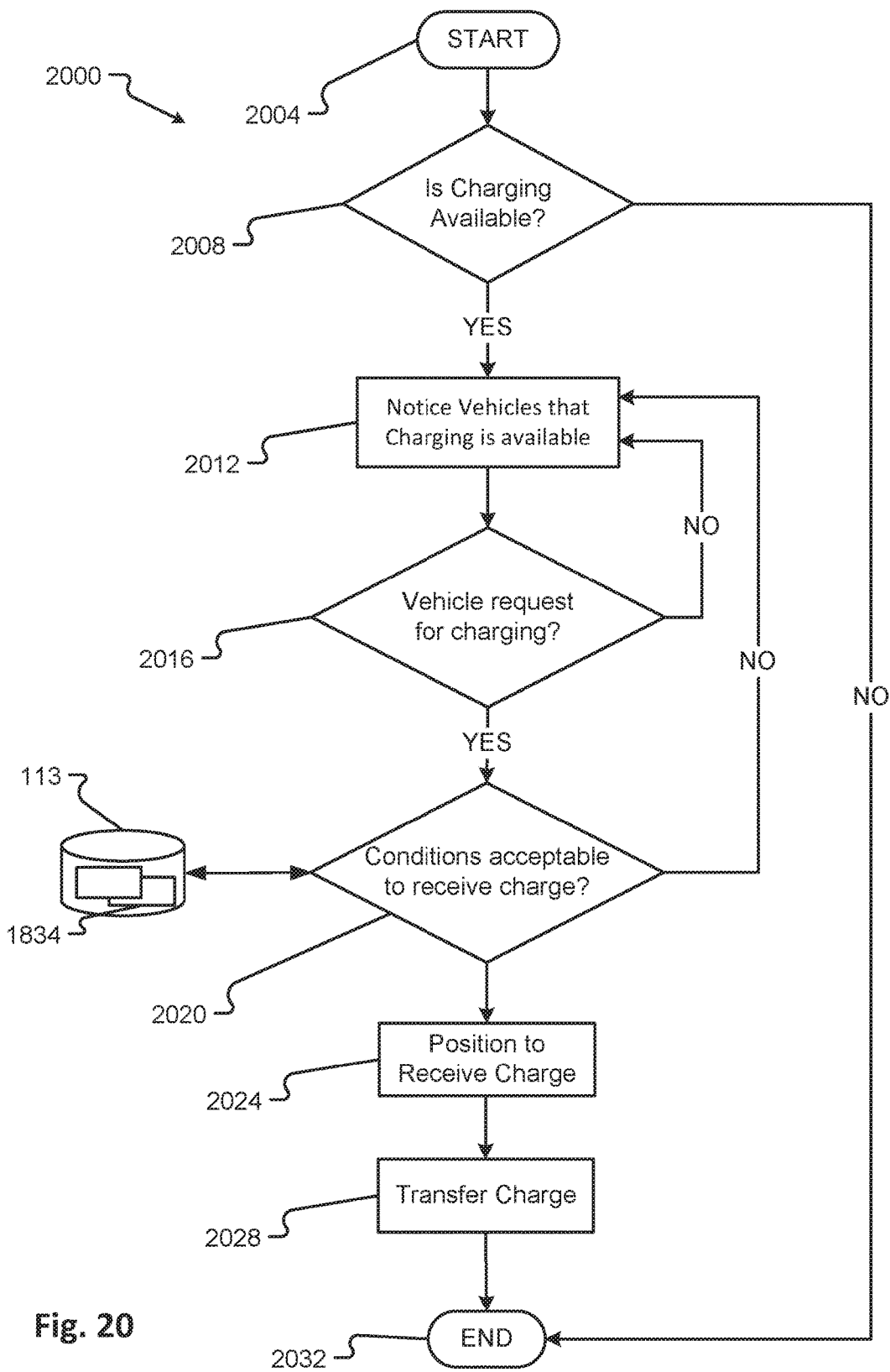
FIG. 20 is a flow or process diagram of a method of charging from an overhead charging system.

FIG. 20 is a flow or process diagram of a method of charging from an overhead environment. The method starts at step 2004 and ends at step 2032.

After starting at step 2004, at step 2008 the method queries as to whether charging is available by overhead charging system 1800. That is, a query is made as to whether the overhead charging system 1800 is able to provide a charging service to a charging panel 108 of vehicle 100. If NO, the method proceeds to step 2032 and ends. (Alternatively, the vehicle 100 may return to a home base station or similar and recharge its energy source i.e. recharge energy storage unit 112.) If the result of the query of step 2008 is YES, the method proceeds to step 2012 wherein notice is provided (by the overhead charging system 1800, e.g.) that charging is available. The notice may comprise targeted communications e.g. by texting to vehicles 100 within a selectable distance. The content of the notice may comprise: the availability of charging, and terms and conditions of charging (cost, payment types, amount available, duration of charging time, etc). The notice may comprise a physical mounted advertisement (eg a lighted sign on overhead charging system 1800 such as on one or more towers 1810) that charging is available, not unlike a taxi "off duty" or "on duty" light.

At step 2016 a query is made as to whether vehicle 100 has requested or requires or seeks a charge. Note that charging panel controller 110 may monitor a state or status of charging (e.g. battery is charged at 32%, or battery charging level drops below a selectable threshold value e.g. below 10%) of the energy storage unit 112 of vehicle 100 to determine if charging is recommended or required. A user, such as a driver or passenger, may also request that the vehicle be charged. If NO, the method proceeds back to step 2012. If YES, the method proceeds to step 2020.

At step 2020, a query is made as to whether the charge receiver 100 vehicle is configured to receive the charging from overhead charging system 1800. Such a query may be facilitated by communications between vehicle "smart" control systems aboard one or both of overhead charging system 1800 and charge receiver vehicle 100, comprising communications between charge provider controller 122 and charging panel controller 110. Note that incompatibilities may include min/max energy transfer thresholds (e.g. voltages), electrical or mechanical incompatibilities between overhead contact 1824 and first wire 1814, and physical incompatibilities between pantograph 1820 and overhead charging system 1800 (e.g. such as exceeding range thresholds of charge line height minimums 1835B and/or maximums 1835C.) If the query answer is a NO, the method proceeds to step 2012. If YES, the method proceeds to step 2024 wherein the charge receiver vehicle 100 is charged by overhead charging system 1800 and the method proceeds to step 2024 wherein the charging panel 108 and/or overhead contact 1824 is positioned with respect to the first wire 1814 so as to receive (or transmit) a charge. The positioning of the charging plate 108 and/or overhead contact 1824 may comprise selection of initial or nominal positioning via data contained in vehicle database 113 through overhead charging data structure 1834 and overhead charging data structure fields 1834A-L. The method 2000 then continues to step 2028 wherein a charge is provided by first wire 1814 of overhead charging system 1800 via overhead contact 1824 to charging panel 108 so as to power or charge energy source 112 or vehicle 100. When charging is complete the method 2000 ends at step 2032.

In some embodiments, the user of vehicle 100 and/or the control system of vehicle accesses vehicle database, or more broadly an external database via wireless communication for available charging sources. From the one or more available charging sources, the user and/or control system of vehicle may negotiate terms and conditions of the charging, comprising pricing, speed, rate and/or duration for the charging, physical interconnection requirements (e.g. a physical connection between vehicle charging panel 108 and charging source charging plate 120 may be required or a set separation distance may be required between the charging panel 108 and the charging source charging plate 120), electrical interconnection requirements (e.g. current or voltage requirements), and environmental setting for the charging (e.g. an established lat/long location for the charging, or a set corridor on a highway, may be required).

In the detailed description, numerous specific details are set forth in order to provide a thorough understanding of the disclosed techniques. However, it will be understood by those skilled in the art that the present techniques may be practiced without these specific details. In other instances, well-known methods, procedures, components and circuits have not been described in detail so as not to obscure the present disclosure.

Although embodiments are not limited in this regard, discussions utilizing terms such as, for example, "processing," "computing," "calculating," "determining," "establishing", "analysing", "checking", or the like, may refer to operation(s) and/or process(es) of a computer, a computing platform, a computing system, a communication system or subsystem, or other electronic computing device, that manipulate and/or transform data represented as physical (e.g., electronic) quantities within the computer's registers and/or memories into other data similarly represented as physical quantities within the computer's registers and/or memories or other information storage medium that may store instructions to perform operations and/or processes.

Although embodiments are not limited in this regard, the terms "plurality" and "a plurality" as used herein may include, for example, "multiple" or "two or more". The terms "plurality" or "a plurality" may be used throughout the specification to describe two or more components, devices, elements, units, parameters, circuits, or the like. For example, "a plurality of stations" may include two or more stations.

It may be advantageous to set forth definitions of certain words and phrases used throughout this document: the terms "include" and "comprise," as well as derivatives thereof, mean inclusion without limitation; the term "or," is inclusive, meaning and/or; the phrases "associated with" and "associated therewith," as well as derivatives thereof, may mean to include, be included within, interconnect with, interconnected with, contain, be contained within, connect to or with, couple to or with, be communicable with, cooperate with, interleave, juxtapose, be proximate to, be bound to or with, have, have a property of, or the like; and the term "controller" means any device, system or part thereof that controls at least one operation, such a device may be implemented in hardware, circuitry, firmware or software, or some combination of at least two of the same. It should be noted that the functionality associated with any particular controller may be centralized or distributed, whether locally or remotely. Definitions for certain words and phrases are provided throughout this document and those of ordinary skill in the art should understand that in many, if not most instances, such definitions apply to prior, as well as future uses of such defined words and phrases.

The exemplary embodiments will be described in relation to communications systems, as well as protocols, techniques, means and methods for performing communications, such as in a wireless network, or in general in any communications network operating using any communications protocol(s). Examples of such are home or access networks, wireless home networks, wireless corporate networks, and the like. It should be appreciated however that in general, the systems, methods and techniques disclosed herein will work equally well for other types of communications environments, networks and/or protocols.

For purposes of explanation, numerous details are set forth in order to provide a thorough understanding of the present techniques. It should be appreciated however that the present disclosure may be practiced in a variety of ways beyond the specific details set forth herein.

Furthermore, it should be appreciated that the various links (which may not be shown connecting the elements), including the communications channel(s) connecting the elements, can be wired or wireless links or any combination thereof, or any other known or later developed element(s) capable of supplying and/or communicating data to and from the connected elements. The term module as used herein can refer to any known or later developed hardware, circuit, circuitry, software, firmware, or combination thereof, that is capable of performing the functionality associated with that element. The terms determine, calculate, and compute and variations thereof, as used herein are used interchangeable and include any type of methodology, process, technique, mathematical operational or protocol.

Moreover, while some of the exemplary embodiments described herein are directed toward a transmitter portion of a transceiver performing certain functions, or a receiver portion of a transceiver performing certain functions, this disclosure is intended to include corresponding and complementary transmitter-side or receiver-side functionality, respectively, in both the same transceiver and/or another transceiver(s), and vice versa.

While the above-described flowcharts have been discussed in relation to a particular sequence of events, it should be appreciated that changes to this sequence can occur without materially effecting the operation of the embodiment(s). Additionally, the exact sequence of events need not occur as set forth in the exemplary embodiments. Additionally, the exemplary techniques illustrated herein are not limited to the specifically illustrated embodiments but can also be utilized with the other exemplary embodiments and each described feature is individually and separately claimable.

Additionally, the systems, methods and protocols can be implemented to improve one or more of a special purpose computer, a programmed microprocessor or microcontroller and peripheral integrated circuit element(s), an ASIC or other integrated circuit, a digital signal processor, a hard-wired electronic or logic circuit such as discrete element circuit, a programmable logic device such as PLD, PLA, FPGA, PAL, a modem, a transmitter/receiver, any comparable means, or the like. In general, any device capable of implementing a state machine that is in turn capable of implementing the methodology illustrated herein can benefit from the various communication methods, protocols and techniques according to the disclosure provided herein.

Examples of the processors as described herein may include, but are not limited to, at least one of Qualcomm® Snapdragon® 800 and 801, Qualcomm® Snapdragon® 610 and 615 with 4G LTE Integration and 64-bit computing, Apple® A7 processor with 64-bit architecture, Apple® M7 motion coprocessors, Samsung® Exynos® series, the Intel® Core™ family of processors, the Intel® Xeon® family of processors, the Intel® Atom™ family of processors, the Intel Itanium® family of processors, Intel® Core® i5-4670K and i7-4770K 22 nm Haswell, Intel® Core® i5-3570K 22 nm Ivy Bridge, the AMD® FX™ family of processors, AMD® FX-4300, FX-6300, and FX-8350 32 nm Vishera, AMD® Kaveri processors, Texas Instruments® Jacinto C6000™ automotive infotainment processors, Texas Instruments® OMAP™ automotive-grade mobile processors, ARM® Cortex™-M processors, ARM® Cortex-A and ARM926EJ-S™ processors, Broadcom® AirForce BCM4704/BCM4703 wireless networking processors, the AR7100 Wireless Network Processing Unit, other industry-equivalent processors, and may perform computational functions using any known or future-developed standard, instruction set, libraries, and/or architecture.

Furthermore, the disclosed methods may be readily implemented in software using object or object-oriented software development environments that provide portable source code that can be used on a variety of computer or workstation platforms. Alternatively, the disclosed system may be implemented partially or fully in hardware using standard logic circuits or VLSI design. Whether software or hardware is used to implement the systems in accordance with the embodiments is dependent on the speed and/or efficiency requirements of the system, the particular function, and the particular software or hardware systems or microprocessor or microcomputer systems being utilized. The communication systems, methods and protocols illustrated herein can be readily implemented in hardware and/or software using any known or later developed systems or structures, devices and/or software by those of ordinary skill in the applicable art from the functional description provided herein and with a general basic knowledge of the computer and telecommunications arts.

Moreover, the disclosed methods may be readily implemented in software and/or firmware that can be stored on a storage medium to improve the performance of: a programmed general-purpose computer with the cooperation of a controller and memory, a special purpose computer, a microprocessor, or the like. In these instances, the systems and methods can be implemented as program embedded on personal computer such as an applet, JAVA.RTM. or CGI script, as a resource residing on a server or computer workstation, as a routine embedded in a dedicated communication system or system component, or the like. The system can also be implemented by physically incorporating the system and/or method into a software and/or hardware system, such as the hardware and software systems of a communications transceiver.

Various embodiments may also or alternatively be implemented fully or partially in software and/or firmware. This software and/or firmware may take the form of instructions contained in or on a non-transitory computer-readable storage medium. Those instructions may then be read and executed by one or more processors to enable performance of the operations described herein. The instructions may be in any suitable form, such as but not limited to source code, compiled code, interpreted code, executable code, static code, dynamic code, and the like. Such a computer-readable medium may include any tangible non-transitory medium for storing information in a form readable by one or more computers, such as but not limited to read only memory (ROM); random access memory (RAM); magnetic disk storage media; optical storage media; a flash memory, etc.

It is therefore apparent that there has at least been provided systems and methods for laser and optical charging and communications. While the embodiments have been described in conjunction with a number of embodiments, it is evident that many alternatives, modifications and variations would be or are apparent to those of ordinary skill in the applicable arts. Accordingly, this disclosure is intended to embrace all such alternatives, modifications, equivalents and variations that are within the spirit and scope of this disclosure.

What is claimed is:

1. A system for charging a moving electric vehicle, the system comprising:
    an electrical storage unit disposed on the moving electric vehicle;
    a charging panel in electrical communication with the electrical storage unit;
    a vehicle controller that determines if the electrical storage unit requires charging and configured to determine if an overhead power source is available and able to charge the electrical storage unit, wherein the charging panel is configured to receive a charge from the overhead power source to charge the moving electric vehicle;
    at least one distance sensor disposed at the charging panel and configured to measure a distance between the charging panel and the overhead power source;
    a movement controller configured to adjust a position of the charging panel; and
    at least one environmental sensor mounted on the moving electric vehicle,
    wherein the movement controller controls the charging panel to be initially positioned at a selectable desired separation distance from the overhead power source such that the charging panel does not contact the overhead power source and the measured distance between the charging panel and the overhead power source is the same as the selectable desired separation distance,
    wherein the selectable desired separation distance is selected from a vehicle database,
    wherein the vehicle database includes a minimum visibility and a maximum wind speed desired for charging with the overhead power source,
    wherein the environmental sensor senses environmental conditions surrounding the moving electric vehicle, the sensed environmental conditions including information regarding a possible roadway hazard or roadway event for the moving electric vehicle, a measured visibility, and a measured wind speed,
    wherein the vehicle controller accesses the vehicle database and determines that the overhead power source is able to charge the moving electric vehicle when the measured visibility is above the minimum visibility and when the measured wind speed is below the maximum wind speed, and
    wherein the movement controller adjusts the position of the charging panel while the moving electric vehicle is moving based on the information in order to maintain the selectable desired separation distance between the overhead power source and charging panel.

2. The system of claim 1, wherein the charging panel is configured to operate in a plurality of states including a retracted state and a deployed state.

3. The system of claim 2, further comprising an actuator interconnected to the charging panel and to the moving electric vehicle, wherein the movement controller adjusts the position of the charging panel using the actuator.

4. The system of claim 3, wherein the at least one distance sensor is configured to measure a distance between the charging panel and a first wire of the overhead power source.

5. The system of claim 4, wherein a selectable nominal deployment distance is selected from the vehicle database.

6. The system of claim 5, wherein the positioning of the charging panel to the selectable nominal deployment distance is performed automatically by the actuator.

7. The system of claim 1, wherein the overhead power source includes a first wire attached to a plurality of towers disposed on or adjacent to a roadway.

8. The system of claim 7, wherein the charging panel is interconnected with a pantograph, the pantograph enabling the charging panel to operate in a retracted state and a deployed state.

9. The system of claim 1, wherein an amount of charge received at the electrical storage unit is selected from the vehicle database.

10. The system of claim 1, wherein the vehicle controller queries the vehicle database to determine if the moving electric vehicle is compatible with the overhead power source.

11. A method for charging a moving electric vehicle, the method comprising:
    determining, by a microprocessor, a charge value of an electrical storage unit disposed on the moving electric vehicle;
    determining, by the microprocessor, if the charge value is below a selectable threshold value;
    identifying, by the microprocessor, if an overhead power source is available for and able to charge the electrical storage unit;
    receiving, from at least one distance sensor disposed at a charging panel of the moving electric vehicle, a distance between the charging panel and the overhead power source;
    receiving, from a vehicle database, a minimum visibility desired for charging with the overhead power source, a maximum wind speed desired for charging with the overhead power source, and a selectable desired separation distance indicating a distance between the overhead power source and the charging panel of the moving electric vehicle;
    receiving, by the microprocessor, sensed environmental conditions from at least one environmental sensor, the sensed environmental conditions including information regarding a possible roadway hazard or roadway event for the moving electric vehicle, a measured visibility, and a measured wind speed; and
    positioning, under control of the microprocessor, the charging panel of the moving electric vehicle to be initially positioned at the selectable desired separation distance from the overhead power source such that the charging panel does not contact the overhead power source and the distance received from the at least one distance sensor is the same as the selectable desired separation distance, wherein the identifying includes determining that the overhead power source is able to charge the moving electric vehicle when the measured visibility is above the minimum visibility and when the measured wind speed is below the maximum wind speed, wherein the charging panel receives charge from a charging line of the overhead power source and charges the electrical storage unit while the moving electric vehicle is moving, and wherein the positioning adjusts the position of the charging panel while the moving electric vehicle is moving based on the information in order to maintain the selectable desired separation distance between the overhead power source and charging panel.

12. The method of claim 11, further comprising:

measuring, by a sensor, an alignment measurement between the charging line and the charging panel;

transmitting, by the microprocessor, the alignment measurement to an alignment controller;

receiving, by the alignment controller, the alignment measurement;

determining, by the microprocessor, a required alignment adjustment; and adjusting, by the microprocessor, the position of the charging panel by the required alignment adjustment.

13. The method of claim 11, wherein the charging panel is configured to operate in a plurality of states including a retracted state and a deployed state.

14. The method of claim 13, further comprising an actuator interconnected to the charging panel and to the moving electric vehicle, wherein the actuator is configured to move the charging panel to receive charge from the overhead power source.

15. The method of claim 14, further comprising determining, by the microprocessor, if the moving electric vehicle is compatible with the overhead power source.

16. The method of claim 11, wherein the overhead power source includes a first wire attached to a plurality of towers disposed on or adjacent to a roadway.

17. The method of claim 16, wherein the charging panel is interconnected with a pantograph, the pantograph enabling the charging panel to operate in a retracted state and a deployed state.

* * * * *